US008366282B2

(12) United States Patent
Plut

(10) Patent No.: US 8,366,282 B2
(45) Date of Patent: *Feb. 5, 2013

(54) POSITIONING INTERFACES FOR PROJECTION DISPLAY DEVICES

(75) Inventor: William J. Plut, Menlo Park, CA (US)

(73) Assignee: Transpacific Image, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/405,834

(22) Filed: Feb. 27, 2012

(65) Prior Publication Data

US 2012/0154764 A1     Jun. 21, 2012

Related U.S. Application Data

(63) Continuation of application No. 12/726,772, filed on Mar. 18, 2010, now Pat. No. 8,147,074, which is a continuation of application No. 11/741,585, filed on Apr. 27, 2007, now Pat. No. 7,703,930, which is a continuation of application No. 10/891,840, filed on Jul. 15, 2004, now Pat. No. 7,281,807.

(60) Provisional application No. 60/487,871, filed on Jul. 16, 2003, provisional application No. 60/487,691, filed on Jul. 16, 2003, provisional application No. 60/487,849, filed on Jul. 16, 2003, provisional application No. 60/487,744, filed on Jul. 16, 2003, provisional application No. 60/487,868, filed on Jul. 16, 2003.

(51) Int. Cl.
*G03B 21/16* (2006.01)
*G03B 21/14* (2006.01)
*G03B 21/22* (2006.01)

(52) U.S. Cl. ............ 353/119; 353/61; 353/52; 353/101; 348/748

(58) Field of Classification Search .................. 353/119, 353/31, 100, 101, 102, 122, 61, 52, 121; 348/739, 744, 750, 758, 759, 771, 794; 362/259, 362/553, 559, 561, 554; 345/905
See application file for complete search history.

(56) References Cited

U.S. PATENT DOCUMENTS

| 4,735,500 | A | * | 4/1988 | Grunwald ..................... 353/61 |
| 4,969,733 | A | | 11/1990 | Jewison |
| 4,978,218 | A | | 12/1990 | Carpenter |
| 5,098,184 | A | | 3/1992 | van den Brandt |
| 5,136,675 | A | | 8/1992 | Hodson |
| 5,170,196 | A | | 12/1992 | Itoh |
| 5,278,596 | A | * | 1/1994 | Machtig ..................... 353/122 |
| 5,287,132 | A | | 2/1994 | Suzuki |
| 5,343,489 | A | | 8/1994 | Wangler |
| 5,347,324 | A | | 9/1994 | Sasaki |
| 5,394,254 | A | | 2/1995 | Cheng |
| 5,416,541 | A | | 5/1995 | Fog |
| 5,418,583 | A | | 5/1995 | Masumoto |

(Continued)

OTHER PUBLICATIONS

OA dated Jun. 25, 2009 for U.S. Appl. No. 11/741,585, 29 pgs.

(Continued)

*Primary Examiner* — Rochelle-Ann J Blackman
(74) *Attorney, Agent, or Firm* — Turocy & Watson, LLP

(57) ABSTRACT

Described herein are devices that provide projection-type video output in a portable and flexible design. The design includes a projection chamber, a base, and an interface that permits relative positioning between the projection chamber and base. The base maintains the position of the display device. The projection chamber includes components responsible for the production of images based on received video data and components responsible for the projection of those images. Relative pointing between the projection chamber and base allows the projection chamber to be pointed—and an output projected image to be positioned—with minimal effort.

20 Claims, 14 Drawing Sheets

U.S. PATENT DOCUMENTS

| | | | |
|---|---|---|---|
| 5,515,391 | A | 5/1996 | Endriz |
| 5,534,950 | A | 7/1996 | Hargis |
| 5,612,968 | A | 3/1997 | Zah |
| 5,624,173 | A | 4/1997 | Davidson |
| 5,651,599 | A | 7/1997 | Fujimori |
| 5,654,776 | A | 8/1997 | Furuya |
| 5,668,595 | A | 9/1997 | Katayama |
| 5,700,076 | A | 12/1997 | Minich et al. |
| 5,782,548 | A | 7/1998 | Miyashita |
| 5,818,639 | A | 10/1998 | Furuya |
| 5,851,060 | A | 12/1998 | Uchiyama |
| 5,927,985 | A | 7/1999 | Lechner |
| 5,959,702 | A | 9/1999 | Goodman |
| 5,959,778 | A | 9/1999 | Shimonura |
| 5,971,545 | A | 10/1999 | Haitz |
| 5,990,983 | A | 11/1999 | Hargis |
| 6,042,068 | A | 3/2000 | Tcherny |
| 6,075,504 | A | 6/2000 | Stoller |
| 6,089,717 | A | 7/2000 | Iwai |
| 6,137,638 | A | 10/2000 | Yamagishi |
| 6,155,687 | A | 12/2000 | Peterson |
| 6,170,953 | B1 | 1/2001 | Lee |
| 6,179,426 | B1 | 1/2001 | Rodriguez, Jr. et al. |
| 6,183,092 | B1 | 2/2001 | Troyer |
| 6,185,047 | B1 | 2/2001 | Peterson |
| 6,191,826 | B1 | 2/2001 | Murakami |
| 6,224,216 | B1 | 5/2001 | Parker et al. |
| 6,246,446 | B1 | 6/2001 | Heimbuch |
| 6,317,170 | B1 | 11/2001 | Hwang |
| 6,323,984 | B1 | 11/2001 | Trisnadi |
| 6,350,033 | B1 | 2/2002 | Fujimori |
| 6,367,935 | B1 | 4/2002 | Wang |
| 6,373,646 | B1 | 4/2002 | Timmermans |
| 6,392,821 | B1 | 5/2002 | Benner, Jr. |
| 6,394,606 | B1 | 5/2002 | Miyawaki |
| 6,416,184 | B1 | 7/2002 | Arai |
| 6,426,781 | B1 | 7/2002 | Lee |
| 6,426,836 | B2 | 7/2002 | Dorsel |
| 6,435,682 | B1 | 8/2002 | Kaelin |
| 6,445,487 | B1 | 9/2002 | Roddy |
| 6,454,417 | B1 | 9/2002 | Takamoto |
| 6,471,356 | B1 | 10/2002 | Gohman |
| 6,472,828 | B1 | 10/2002 | Pruett |
| 6,480,634 | B1 | 11/2002 | Corrigan |
| 6,481,852 | B2 | 11/2002 | Osaka |
| 6,481,855 | B2 | 11/2002 | Oehler |
| 6,488,380 | B1 | 12/2002 | Fujimori |
| 6,490,011 | B1 | 12/2002 | Cooper |
| 6,491,398 | B2 | 12/2002 | Takeuchi |
| 6,501,866 | B2 | 12/2002 | Thomas |
| 6,577,429 | B1 | 6/2003 | Kurtz et al. |
| 6,594,090 | B2 | 7/2003 | Kruschwitz |
| 6,600,590 | B2 | 7/2003 | Roddy |
| 6,604,829 | B2 | 8/2003 | Rodriguez, Jr. |
| 6,625,381 | B2 | 9/2003 | Roddy |
| 6,636,339 | B2 | 10/2003 | Lee |
| 6,665,478 | B1 | 12/2003 | Shen |
| 6,709,114 | B1 | 3/2004 | Duggan |
| 6,728,274 | B1 | 4/2004 | Sousa |
| 6,736,517 | B2 | 5/2004 | Sherman |
| 6,747,781 | B2 | 6/2004 | Trisnadi |
| 6,764,107 | B1 | 7/2004 | Obahi |
| 6,769,772 | B2 | 8/2004 | Roddy et al. |
| 6,771,326 | B2 | 8/2004 | Flint |
| 6,790,205 | B1 | 9/2004 | Yamazaki |
| 6,801,299 | B2 | 10/2004 | Kremer |
| 6,817,632 | B1 | 11/2004 | You |
| 6,821,026 | B2 | 11/2004 | Devine |
| 6,863,402 | B2 | 3/2005 | Roddy et al. |
| 6,864,861 | B2 | 3/2005 | Schehrer et al. |
| 6,947,459 | B2 | 9/2005 | Kurtz et al. |
| 7,088,321 | B1 | 8/2006 | Parker |
| 7,156,522 | B2 | 1/2007 | Plut |
| 7,281,807 | B2 * | 10/2007 | Plut ........................ 353/119 |
| 7,510,284 | B2 | 3/2009 | Plut |
| 7,703,930 | B2 * | 4/2010 | Plut ........................ 353/119 |
| 8,147,074 | B2 * | 4/2012 | Plut ........................ 353/119 |
| 2002/0118151 | A1 * | 8/2002 | Chen ........................ 345/84 |
| 2002/0126479 | A1 | 9/2002 | Zhai et al. |
| 2004/0135874 | A1 | 7/2004 | Oehlbeck et al. |
| 2005/0147135 | A1 | 7/2005 | Kurtz et al. |
| 2007/0145915 | A1 | 6/2007 | Roberge et al. |
| 2007/0195276 | A1 | 8/2007 | Plut |
| 2007/0205300 | A1 | 9/2007 | Plut |

OTHER PUBLICATIONS

OA dated Mar. 8, 2010 for U.S. Appl. No. 11/741,499, 24 pgs.
OA dated Dec. 28, 2010 for U.S. Appl. No. 12/726,772, 21 pages.
OA dated Mar. 29, 2011 for U.S. Appl. No. 11/741,217, 32 pgs.
OA dated Jun. 14, 2011 for U.S. Appl. No. 12/726,772, 16 pages.
OA dated Aug. 19, 2011 for U.S. Appl. No. 11/741,217, 19 pgs.

* cited by examiner

POSITIONING INTERFACES FOR PROJECTION DISPLAY DEVICES

CROSS-REFERENCE TO RELATED APPLICATIONS

This application is a continuation of pending U.S. patent application Ser. No. 12/726,772 entitled "POSITIONING INTERFACES FOR PROJECTION DISPLAY DEVICES" and filed on Mar. 18, 2010, which is a continuation of U.S. patent application Ser. No. 11/741,585, filed on Apr. 27, 2007 and entitled "POSITIONING INTERFACES FOR PROJECTION DISPLAY DEVICES", Issued U.S. Pat. No. 7,703,930 Apr. 27, 2010, which is a continuation of U.S. patent application Ser. No. 10/891,840, filed Jul. 15, 2004 and entitled, "POSITIONABLE PROJECTION DISPLAY DEVICES", Issued U.S. Pat. No. 7,281,807 Oct. 16, 2006, which claims priority under 35 U.S.C. §119(e) from each of U.S. Provisional Patent Application No. 60/487,868 (filed Jul. 16, 2003), U.S. Provisional Patent Application No. 60/487,871 (filed Jul. 16, 2003), U.S. Provisional Patent Application No. 60/487,691 (filed Jul. 16, 2003), U.S. Provisional Patent Application No. 60/487,849 (filed Jul. 16, 2003), and U.S. Provisional Patent Application No. 60/487,744 (filed Jul. 16, 2003). The entirety of each of the above-referenced applications are incorporated by reference herein.

BACKGROUND OF THE INVENTION

This invention relates to display devices that project an image. More particularly, the present invention relates to projector designs that reduce package size, improve heat management, and increase usage flexibility.

Most computer systems employ a display device to output video information to one or more users. Desktop computers, laptop computers, personal digital assistants (PDAs), video game consoles, cellular telephones and digital video cameras output video information to a number of video display technologies.

Projection-type display systems are a relatively new display technology—and offer image sizes having diagonal spans up to 30 feet. A recent increase in projector sales has been motivated by boardroom and classroom usage where numerous people in a large space can simultaneously view a projected image. Consumer demand in this aspect of the market has led manufacturers to evolve projectors towards increasingly powerful and feature-rich products. As a result, consumer selection is restricted to expensive and bulky 'cinder-block' designs.

Imperfect and realistic environment conditions complicate the use of conventional cinder-block projector designs. It is common for light output by a projector to encounter physical obstacles—either along a projection path between a projection lens and receiving surface, at the receiving surface, or both. A projector used in an office or home may encounter a wide variety of projection path obstacles such as plants, bookshelves, chairs, other miscellaneous furniture, etc., that limit where the projector is placed and where the image is cast. Conventional projectors have scanty means for positioning an image and avoiding obstacles, often resorting to moving the projector (often to another table) for horizontal image positioning or propping it up under one or more books or other objects for vertical image positioning. The lack of mobility for a projector fixed to a ceiling adds to the current lack of image placement control.

Based on the foregoing, it should be apparent that portable visual display options are still limited and that alternatives would be desirable.

SUMMARY OF THE INVENTION

The present invention relates to devices that provide projection-type video output in a portable and flexible design. The design includes a projection chamber, a base, and an interface that permits relative positioning between the projection chamber and base. The base maintains the position of the display device. The projection chamber includes components responsible for the production of images based on received video data and components responsible for the projection of those images. Relative pointing between the projection chamber and base allows the projection chamber to be pointed—and an output projected image to be positioned—with minimal effort.

Relative pointing between a projection chamber and base enables an image-receiving surface to vary according to an environment or application. In one embodiment, the positioning interface includes two degrees of freedom that allow a user to point the projection chamber and position an image in many directions relative to the base. This permits projection at odd angles, such as those encountered with projector usage in confined spaces such as an office cubicle. Alternately, for a positioning interface comprising an elongated stem or neck, the present invention enables image projection onto a tabletop that the base rests upon. The present invention also allows re-positioning of a projected image on multiple walls and surfaces without moving the projector base.

In one aspect, the present invention relates to a display device. The display device comprises a base, a projection chamber, and a positional interface. The base includes a housing and a light source within the housing. The projection chamber includes a) a projection chamber housing, b) an optical modulation device configured to selectively transmit light generated by the light source according to video data included in a video signal provided to the optical modulation device, and c) a projection lens system configured to output light transmitted by the optical modulation device along a projection path. The positional interface is coupled to the base and coupled to the projection chamber, allows the projection chamber to be moved relative to the base, and allows the projection chamber to maintain a constant position relative to the base after being moved.

In another aspect, the present invention relates to a display device. The display device comprises a light source chamber, a projection chamber, and a positional interface. The light source chamber includes a housing, a light source within the housing, and a power source within the housing configured to provide power to the light source. The projection chamber includes a) a projection chamber housing, b) an optical modulation device configured to selectively transmit light generated by the light source according to video data included in a video signal provided to the optical modulation device, and c) a projection lens system configured to output light transmitted by the optical modulation device along a projection path. The positional interface is coupled to the light source chamber and coupled to the projection chamber, allows the projection chamber to be moved relative to the light source chamber, and allows the projection chamber to maintain a constant position relative to the light source chamber after being moved.

In yet another aspect, the present invention relates to a display device. The display device comprises a base, an about cylindrical projection chamber, and a positional interface.

The base includes a housing and a light source. The projection chamber includes a) a projection chamber housing, b) an optical modulation device configured to selectively transmit light generated by the light source and a projection lens system configured to output light transmitted by the optical modulation device along a projection path that is collinear with an axis of the about cylindrical projection chamber housing. The positional interface is coupled to the base housing and coupled to the projection chamber housing at a location between an aft end of the projection chamber that includes the optical modulation device and a forward end that includes an output lens of the projection lens system. The positional interface allows the projection chamber to be moved relative to the base, and allows the projection chamber to maintain a constant position relative to the base after being moved.

In another aspect, the present invention relates to a method for projecting video output from a display device. The method comprises projecting the video output towards a first location in response to a user pointing a projection lens included in the display device in a first direction. The method also comprises projecting the video output towards a second location in response to the user pointing the projection lens in a second direction. The projection lens is pointed in the second direction without the user changing positioning between an object that supports the display device and a portion of the display device that includes a light source for generating light.

These and other features of the present invention will be presented in more detail in the following detailed description of the invention and the associated figures.

Before committing to the Detailed Description, it may facilitate understanding to clarify certain words and phrases used in this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, be proximate to, be bound to or with, have, have a property of, or the like. Support and definitions for certain words and phrases are provided throughout this patent document, and those of ordinary skill in the art should understand that in many, if not most instances, such support applies to prior, as well as future uses of such words and phrases.

DETAILED DESCRIPTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
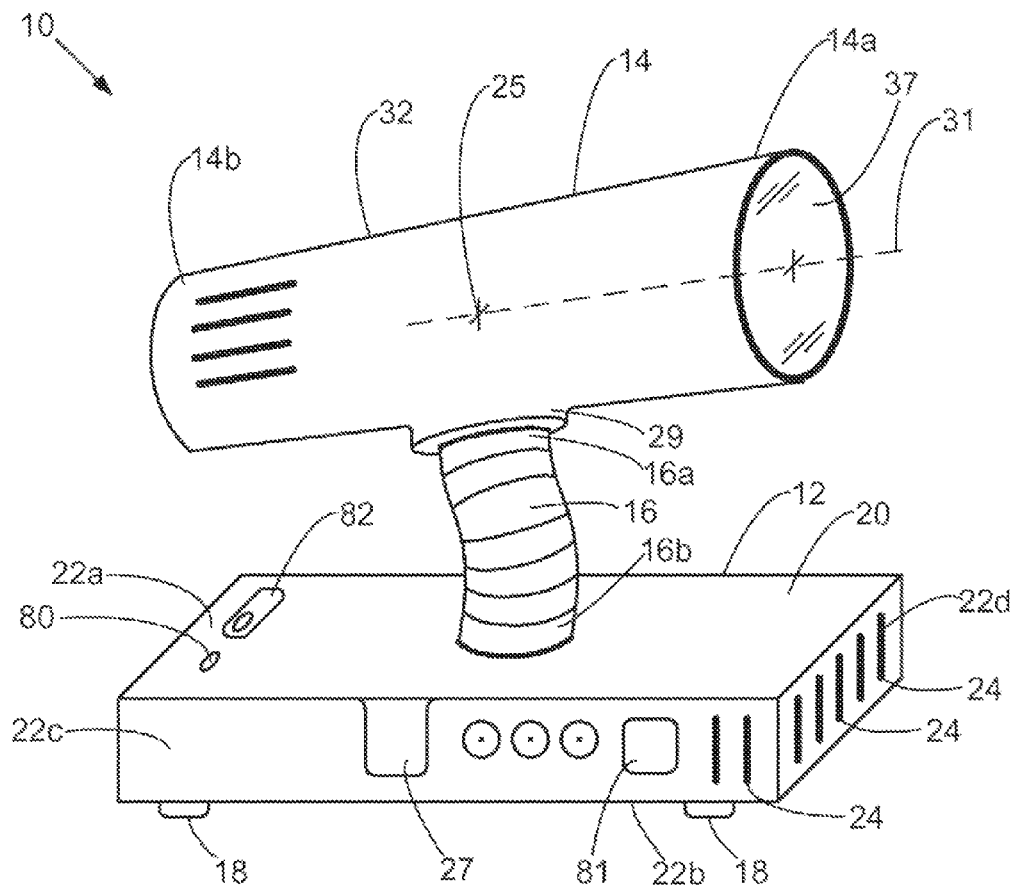
FIG. 1 illustrates a top perspective view of a display device in accordance with one embodiment of the present invention.

FIG. 1 illustrates a top perspective view of a display device 10 in accordance with one embodiment of the present invention. Display device 10 produces and projects a video image for display on a receiving surface; and comprises base 12, projection chamber 14, and positional interface 16.

Base 12 is configured to maintain the position of display device 10, e.g., relative to a stationary object. In one embodiment, base 12 includes a relatively flat bottom that allows display device 10 to rest upon a flat surface such as a table or desk. One or more high friction pads 18 attach to a bottom surface 22b of base 12 to increase static friction with the flat surface. Base 12 may also comprise a receiving slot 27 that allows modular attachment of functional accessories for display device 10. For example, slot 27 may receive a clip attachment that comprises a spring-powered clip for clamping base 12 onto a stationary object. This allows base 12 and display device 10 to be mounted on non-flat or non-horizontal surfaces such as vertical walls of bookshelves and cubicles, and personal clothing or accessories such as belts or straps, for example. Base 12 may also comprise another slot on its bottom side, dimensioned the same, to permit reception of the functional accessories on the bottom side of base 12.

A housing 20 protects internal components within base 12, defines outer dimensions of base 12, and defines dimensions of an inner light source chamber (FIG. 2). As shown, housing 20 is about rectangular and comprises four sidewalls 22c-f (only facing sidewalls 22c and 22d are shown in FIG. 1), top wall 22a, and bottom wall 22b. Walls 22 comprise a suitably stiff material that grants structural rigidity for base 12 and mechanical protection for internal components within housing 20. A lightweight and stiff plastic or aluminum is suitable in this regard. One or more walls 22 of housing 20 may also include air vents 24 that allow air flow between the inner chamber and an environment external to housing 20. In another embodiment, housing 20 includes a more rounded or contoured shape than that shown in FIG. 1 and does not include orthogonal walls or a rectangular shape.

Figure 2A:
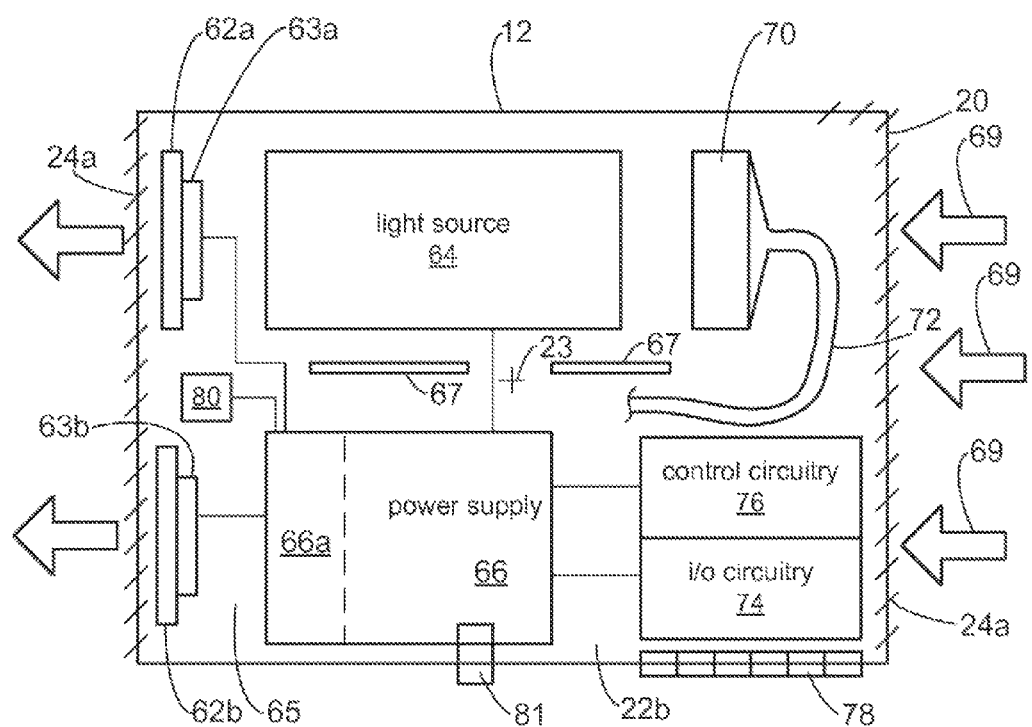
FIG. 2A shows a simplified top view schematic of components within a base of the display device illustrated in FIG. 1 in accordance with one embodiment of the present invention.

In one embodiment, base 12 is designed or configured to maintain balance of display device 10. In this case, base 12 may be designed to maintain balance for any position of projection chamber 14 relative to base 12 while base 12 rests on a flat surface. Thus, components within base 12 may be arranged and situated such that they cumulatively provide a center of mass 23 relatively close to a geometric center for a footprint of base 12 (FIG. 2A). As shown in FIG. 2A, light source 64 and power supply 66, which are typically the heaviest components in base 12, are disposed relatively central to the footprint in one dimension and on opposite sides of center of mass 23 in the other dimension. In a specific embodiment, components within base 12 are arranged within base 12 according to their weight in order to substantially balance moments about a center of mass 23. The exact position of each component will depend of on the number and type of components and base 12 layout. In addition, housing 20 may be sized to provide a wide enough footprint to balance moments produced by positions and orientations of projection chamber 14 away from a center of mass 23 for base 12.

Projection chamber 14 includes components responsible for the production of images based on received light and received video data, and components responsible for the projection of those images. Projection chamber 14 comprises a projection chamber housing 32, an optical modulation device, and an output projection lens system. The optical modulation device selectively transmits light generated by a light source in base 12 according to video data included in a video signal provided to the optical modulation device, and will be described in further detail with respect to FIG. 3A. The projection lens system outputs light transmitted by the optical modulation device along a projection path 31, and will also be described in further detail with respect to FIG. 3A.

In operation, a light source within base 12 generates light which is provided to the optical modulation device within projection chamber 14 as a luminous flux. In one embodiment, one or more optical fibers transmit light from the light source within base 12 to the optical modulation device within projection chamber 14. The optical modulation device selectively transmits light according to video data in a signal that corresponds to an image to be projected. The projection lens system enlarges and projects an image formed by the optical modulation device. Typically, the image is cast with a splay angle such that the image enlarges as the distance to a receiving surface increases.

Projection chamber 14 comprises a projection chamber housing 32 that protects internal components of projection chamber 14; and defines outer and inner dimensions of projection chamber 14. As shown, housing 32 is about cylindrical, except for an added receiving interface 29 on its bottom side. Housing 32 has a cylindrical axis that is about collinear with output projection path 31. An output optical projection lens 37 of the projection lens system forms and seals a forward end 14a of projection chamber 14. In a specific embodiment, the average diameter of cylindrical housing 32 is relatively within 10 percent of the diameter of output lens 37. In another embodiment, projection chamber housing 32 tapers slightly such that forward end 14a is slightly larger than an aft end 14b, resulting in a slightly frustoconical shape where lens 37 constitutes the larger end. The present invention contemplates that shape and design of projection chamber 14 may vary. For example, forward end 14a of projection chamber 14 may be rounded to accommodate a circular output lens 37 while aft end 14b is cornered to accommodate a rectangular optical modulation device and associated support components that are locally contained better by a rectangular housing. Housing 32 defines an inner chamber as described in further detail with respect to FIG. 3A. Housing 32 comprises a suitably stiff material for structural rigidity of base 12 and internal component protection. A lightweight and stiff plastic or aluminum is suitable for most designs.

A receiving interface 29 is disposed on the lower side of projection chamber 14 and permits coupling between projection chamber 14 and positional interface 16. Interface 29 also permits containment and protection of display device 10 components that do not entirely fit within projection chamber 14, or components that require spatial arrangements outside of projection chamber 14. In one embodiment, interface 29 comprises the same material as housing 32 and extends the interior projection chamber provided by housing 32.

Positional interface 16 allows projection chamber 14 to be moved relative to base 12, and allows projection chamber 14 to maintain a constant position relative to base 12 after being moved. Thus, positional interface 16 allows a user to point projection chamber 14 and manipulate the position of an output image projected by display device 10 with ease. In one embodiment, positional interface 16 comprises a ball and socket combination that permits relative rotational movement between projection chamber 14 and base 12. This embodiment will be discussed in further detail with respect to FIG. 4B. In another embodiment, positional interface 16 comprises corrugated metal tubing that is sufficiently stiff to hold a position for projection chamber 14, while compliant enough for a user to bend the tubing to achieve a desired position and orientation for projection chamber 14. This embodiment will be discussed in further detail with respect to FIG. 4A.

Positional interface 16 couples to base 12 and couples to projection chamber 14. For the embodiment shown in FIG. 1, positional interface 16 comprises an upper end 16a that attaches to housing 32 of projection chamber 14 and a lower end 16b that attaches or couples to housing 20 of base 12. More specifically, a housing 32 portion of receiving interface 29 allows attachment to upper end 16a, while a central portion of top wall 22a allows attachment to lower end 16b. As shown, positional interface 16 couples to housing 32 at a location between an aft end of projection chamber 14 and a forward end that includes output lens 37.

In one embodiment, upper end 16b of positional interface 16 couples at a location relatively close to a center of mass 25 of projection chamber 14 to minimize mechanical moments transmitted onto base 12, e.g., those resulting from a displacement of center of mass 25 away from a center of mass 23 for base 12. In another embodiment, base 12 includes a recessed groove in top wall 22a that allows positional interface 16 to be folded or collapsed down into top wall 22a, thereby decreasing the profile of display device 10 during non-use.

FIG. 2A shows a simplified top view schematic 50 of components within base 12 in accordance with one embodiment of the present invention. A light source chamber 65 is defined in volume and shape by inside walls 22a-f of base 12. Light source chamber 65 comprises fans 62, light source 64, power supply 66, fiber-optic interface 70, fiber-optic 72, input output circuitry 74, control circuitry 76, and input/output interfaces 78.

Fans 62a and 62b move air through light source chamber 65 for cooling components within light source chamber 65. In one embodiment, fans 62 draw air in through inlet air vents 24a on one side of base 12 and exhaust heated air out of exhaust air vents 24b after the air has cooled internal components of base 12 and walls of housing 20. One skilled in the art will appreciate that fan 62 and vent 24 placement will vary with internal component placement within light source chamber 65. Specifically, fan 62 placement—and airflow patterns effected by fans 62 within light source chamber 65—is designed according to individual temperature regulation requirements and heat generation contributions of components within base 12. Typically, light source 64 and power supply 66 generate the largest proportion of heat within base 12, while control circuitry 76 and input/output circuitry 74 call for tighter temperature regulation. Correspondingly, inlet air 69 passes in through inlet air vents 24a, initially passes and cools control circuitry 76 and input/output circuitry 74 while the air is relatively cool, passes across power supply 66 and light source 64, and exits out exhaust air vents 24b. The exhaust air may also cool fan motors 63a and 63b, which rotate fans 62a and 62b, respectively. In one embodiment, multiple fans 62 are used to permit a lower profile for base 12. As one skilled in the art will appreciate, the number and size of fans 62 used will depend on heat generation within display device 10 and a desired air flow to maintain one or more heat dissipation goals. Light source chamber 65 may also include one or more vertical or horizontal airflow guides 67 within light source chamber 65 to direct and distribute airflow as desired. In one embodiment, light source 64 comprises one or more diode laser arrays and one or more circuit boards to power and control the diode lasers. In this case, airflow guides 67 are arranged to direct cooling air across the surfaces of each circuit board. As will be described in further detail below, fans 62a and 62b may also be responsible for drawing air through positional 16 interface and to or from projection chamber 14 to cool the optical modulation device included therein.

Figure 2B:
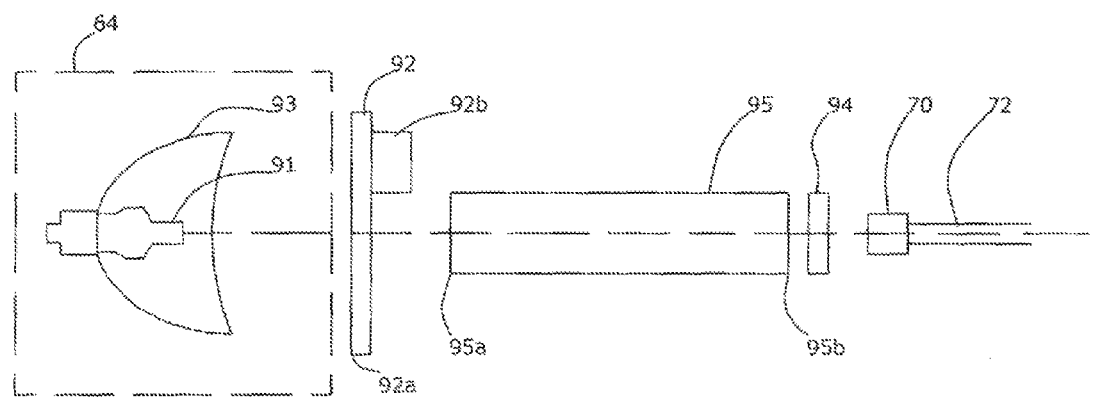
FIG. 2B illustrates a light source configuration in accordance with one embodiment of the present invention.

Light source 64 is arranged within housing 20 and generates light. Display device 10 may employ a number of light generating technologies and configurations for generating light, each of which includes its own set and arrangement of light generation and light manipulation components. FIG. 2B illustrates a lamplight configuration suitable for use within light source chamber 65 in accordance with one embodiment of the present invention. In this case, light source chamber 65 includes a lamp 91, color wheel 92, reflector 93, integrator tunnel 95, and one or more relay optics components 94.

Lamp 91 generates white light and may comprise a discharge lamp, a high-pressure mercury lamp, a metal halide lamp, a xenon lamp, or halogen lamp, for example. Lamp 91 is arranged in the vicinity of reflector 93 and provides light output at a focus of reflector 93. Reflector 93, such as an about parabolic mirror, redirects and focuses radiant light generated by the lamp 91 into an opening of integrator tunnel 95. A surface treatment of reflector 93 may also used to absorb infrared and ultraviolet energy produced by lamp 91.

Figure 3A:
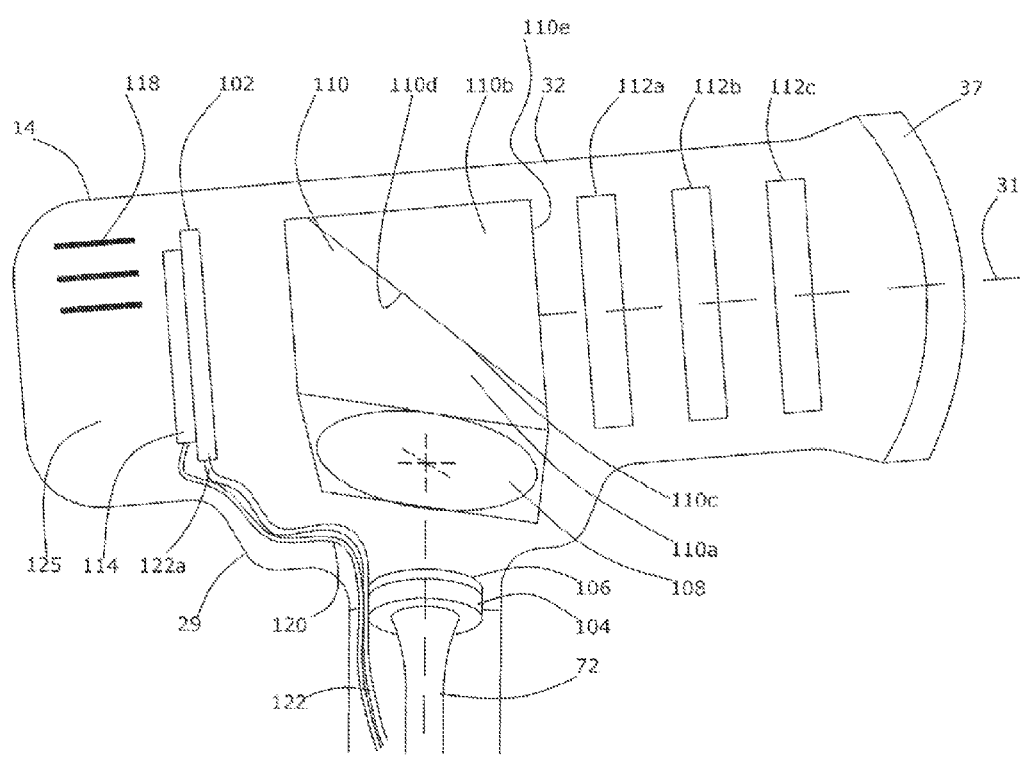
FIG. 3A shows a simplified side view illustration of components within the projection chamber of FIG. 1 in accordance with one embodiment of the present invention.

Color wheel 92 intercepts light provided by lamp 91 before receipt by integrator tunnel 95, and includes a circular light filter 92a that varies filter color with rotation of a motor 92b that rotates circular filter 92a. Light filter 92a converts white light into sequential red, green and blue light in a time synchronous manner that corresponds to red, green and blue video data provided in a video signal to the optical modulation device 102 (FIG. 3A). Color wheel 92 may also include a reflective coating that prevents ultraviolet energy from reaching ultraviolet energy sensitive components in display device 10.

Integrator tunnel 95 transmits light received at its input end 95a to an output end 95b. Integrator tunnel 95 uses total internal reflection to output luminous flux with an about uniformly distributed intensity across a shape determined by an output geometry at output end 95b, which is typically rectangular. If required, relay optics components 94, typically comprising one or more convex lenses, convert light flux output by integrator tunnel 95 from a size that exists at an output end 95b to a size that is suitable for reception by fiber-optic interface 70.

Figure 2C:
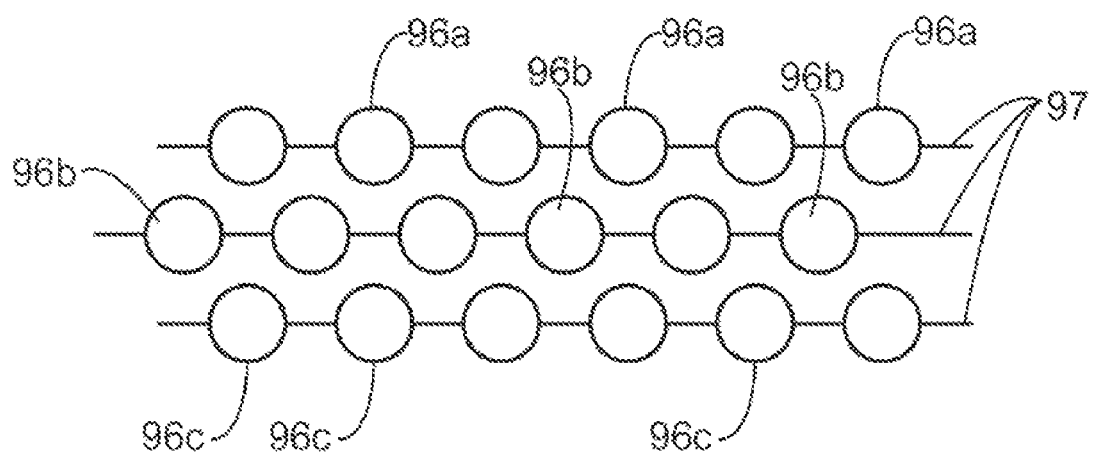
FIGS. 2C and 2D illustrate simplified front and top perspective views, respectively, of a diode laser light source configuration in accordance with another embodiment of the present invention.
Figure 2D:
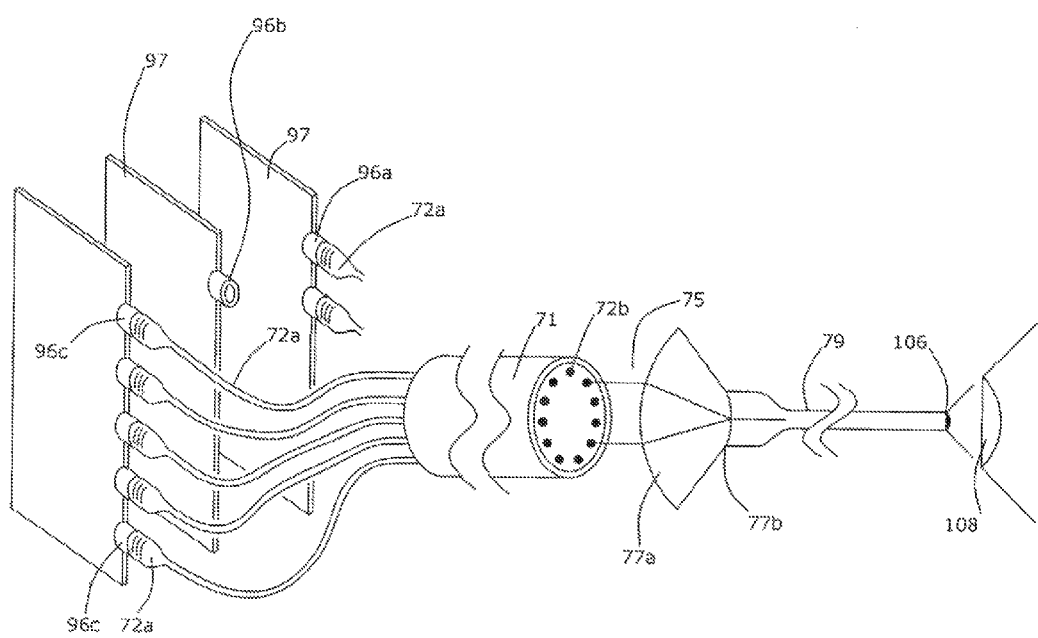

FIGS. 2C and 2D illustrate simplified front and top perspective views, respectively, of a light source configuration in accordance with another embodiment of the present invention. In this case, light source chamber 65 includes an array of lasers 96 that generate collimated light. Lasers 96 may comprise diode lasers and diode pumped solid-state (DPSS) lasers, for example. The collimated light produced by a diode laser differs from radiant light and is characterized by light that is output with about the same output direction, and significantly in phase.

The array of lasers may comprise one or more red diode lasers 96a or red DPSS lasers 96a, one or more green DPSS lasers 96b, and one or more blue diode lasers 96c or blue DPSS lasers 96c. The number and power of lasers for each color is scaled according to a desired light intensity output for display device 10 and according to the light sensitivity of a viewer to each color, as one skilled in the art will appreciate. Each laser 96 is installed on a circuit board 97, which mounts, and provides electrical control for, each laser 96 installed thereon. Multiple lasers 96 may be mounted on a single board 97 to reduce space occupied by light source 64. Including multiple lasers 96 for a single color allows output luminosity of display device 10 to vary with the number of lasers 96 turned on for each color, and allows for redundant control of light generation by diode lasers 96. Thus, one or more of the lasers may be turned off if less light intensity is desired, longevity of individual lasers 96 benefits from periodic shutdown, or power conservation for display device 10 is preferred. Further description of laser-based projection systems suitable for use with the present invention are described in commonly owned and co-pending patent application entitled "PROJECTION-TYPE DISPLAY DEVICES WITH REDUCED WEIGHT AND SIZE", naming William J. Plut as inventor, and filed on the same day as this application. This application is incorporated by reference in its entirety for all purposes.

In one embodiment, light output from the lasers is provided to fiber-optic cabling 72. Fiber-optic cabling 72 includes one or more fiber optic cables that transmit light from each laser 96 along multiple or common optical paths to relay optics system 106 and 108 disposed along a light path between an exit end of fiber-optic cabling 72 and an optical modulation device 44 (FIG. 3A). Each cable 72 has an inlet end 72a that receives light from a laser 96 and an outlet end 72b that outlets the laser light for transmission to relay optics 106 and 108, and subsequent transmission to optical modulation device 44. Since fiber-optic cabling 72 may be bent and flexibly positioned, cabling 72 advantageously allows light transmission between lasers 96 and relay optics system regardless of the positioning and orientation between the lasers and optics system. For example, this allows flexible arrangement of lasers 96, relay optics 106 and 108 and prism 110 (FIG. 3A), which may be used to improve space conservation within base 12, decrease the footprint of base 12, and minimize display device 10 size. In addition, flexible fiber-optic cabling 72 also allows positional interface 16 to move without compromising light provision to the optical modulation device in projection chamber 14.

The number of fiber optic cables in cabling 72 will vary with design. Multiple fiber-optic cables 72 may be employed in a design where each cable 72 services one or more lasers. As shown in FIG. 2D, light from each laser 96 is first transmitted into a fiber-optic cable 72 dedicated to each laser; and subsequently routed and transmitted into a common fiber-optic cable 71. Each laser dedicated fiber-optic cable 72 thus receives laser light from an individual laser 96, and transmits the light to junction 75. In one embodiment, each fiber-optic cable 72 attaches directly to an individual laser 96. For example, each fiber-optic cable 72 may include a fixture with an inner threaded interface that matches a threaded interface disposed on an outside surface of a diode laser 96 housing. Commercially available fiber-optic cables, such as that available from Ocean Optics Inc. of Dunedin, Fla., may come standard with such coupling and alignment fixtures. In a specific embodiment, a short focal length normal or GRIN lens is mounted at the inlet end of each cable 72 to facilitate laser-to-fiber light transition and collimated transfer into cable 72.

Junction 75 permits transmission of light from fiber-optic cables 72 into converging optics 77, and into common fiber-optic cable 79. Converging optics 77 redirect incoming light from each fiber-optic cable 72 into common fiber-optic cable 79 and comprise a converging lens 77a that redirects light toward re-collimating lens 77b, which collimates and re-directs incoming laser light from converging lens 77a into common optical fiber 79. Although not shown, junction 75 may also include a rigid structure, such as a suitably dimensioned molded plastic, that fixtures (holds and positions) fiber-optic cables 72 and 79. In a specific embodiment, junction 75 comprises an optical adhesive that adheres cables 72 directly to lens 77a. In another specific embodiment, the outlet end 72b the fiber-optic cables 72 are combined into a larger cable 71 that contains multiple fibers. Multiple fiber cables, such as fiber ribbon-based cables and those that employ multiple fibers located circumferentially within a round tube, are commercially available from a variety of vendors.

Multiple fiber-optic cable designs may be employed where each cable transmits a primary color. For example, three fiber-optic cables may be employed in which each cable transmits light from a primary color set of lasers along three different optical paths to three primary color dedicated optical modulation devices. Alternately, as shown in FIG. 2D, a common fiber-optic cable may be used to transmit sequentially emitted red, green and blue light along a common light path to a single mirror-based optical modulation device 44. Fiber-optic cabling 72 may comprise single mode or multimode fibers such as those readily available from a wide variety of vendors known to those skilled in the art. In some cases, a converging lens is disposed at outlet end 72b when fiber-optic cable 72 is a single mode fiber to correct for any divergence resulting from light transmission within the single mode fiber-optic cable 72.

One advantage of diode lasers for light generation is that the diode lasers each output relatively monochromatic colored light, thereby eliminating the need for a color wheel and its associated spatial requirement; and eliminating the color wheel motor which also occupies space, consumes power and generates heat. In addition, the highly collimated and smaller cross-sectional area laser output needs less space and smaller optics for cross-sectional area manipulation than light output by a lamp, saving significant space that would otherwise be required for larger light condensing lenses and their required focal lengths for condensing of light generated by a white light lamp. Further, frame and color sequential information output by a diode laser light generation system can be digitally synchronized faster and with greater precision than with a mechanical color wheel system. Output lenses for each diode laser may also include custom shaping that corrects for any astigmatism and divergence provided by the diode laser generator. Further description of astigmatism and divergence correcting lenses are described in commonly owned and co-pending patent application entitled "PROJECTION-TYPE DISPLAY DEVICES WITH REDUCED WEIGHT AND SIZE", which was incorporated by reference above.

Returning back to FIG. 2A, inner light chamber 65 may also employ other light source arrangements to generate light for display device 10. Some light source arrangements, for example, may comprise an array of radiant light emitting diodes (characterized by radiant, non-lasing or non-collimated light generation). Similar to diode and DPSS lasers, radiant light emitting diodes consume less power and generate less heat than a white light lamp, and also emit colored light and thereby may operate without a color wheel. Light chamber 65 may also include one or more dichroic mirrors in white light generation assemblies to separate red, green and blue light for transmission within fiber optic cables 72 to color dedicated optical modulation devices, such as three liquid crystal display (LCD) valves employed for red, green and blue control.

Returning to FIG. 2A, power supply 66 is configured to electrical power to light source 64 and other components within display device 10 that rely on electrical power. Thus, power supply 66 provides electrical energy to control circuitry 76, input/output circuitry 74, fans 62, power diode 80, and components within projection chamber 14 such as optical modulation device 102 (FIG. 3A). A power cord port 81 receives a power cord, which couples power supply 66 to an AC power source such as a wall power supply. In one embodiment, conversion of AC power to DC power occurs in a transformer included between ends of the power cord, as is common with many laptop computer power cords, thereby reducing the size of power supply 66, base 12 and display device 10 and increasing portability of display device 10. Circuitry within power supply 66 may then convert incoming power to one or more DC voltages for specific components in display device 10.

In another embodiment, power supply 66 comprises at least one rechargeable battery 66a. Battery 66a may be recharged using power provided through inlet port 81. Battery 66a allows display device 10 to operate on stored energy and without reliance on proximity to an AC power source, which further increases portability of display device 10. For example, inclusion of a battery in base 12 extends usage into a car, library, coffee shop, remote environment, or any other setting where AC and fixed power outlets are not readily available or within reach.

At least one fiber-optic cable 72 transmits light from light source 64 to relay optics (FIG. 3A) disposed along a light path between an exit end of fiber-optic cable 72 and an optical modulation device (FIG. 3A) in projection chamber 14. With respect to device 10 structure, fiber-optic cable 72 transmits light from one compartment to a separate compartment, namely, from light source chamber in base 12 to projection chamber 14. The number of fiber optic cables will vary with design. As mentioned above, multiple fiber-optic cables may be employed in a laser light generation design, for example, where each cable 72 services one or more diode lasers. Alternatively, each cable 72 may service a primary color. One or more fiber-optic cables 72 may also be used to transmit light from a lamp. For example, one fiber-optic cable may be used to transmit sequentially controlled red, green and blue generated by a diode laser array and transmitted along a single light path to a single mirror-based optical modulation device. Three fiber-optic cables may be employed to transmit light from a) a single lamp that outputs white light which is subsequently separated into three primary colors, or b) a laser array that outputs red, green and blue light into three fiber-optic cables, to three optical modulation devices that are each dedicated to modulation of a primary color.

Fiber optic interface 70 facilitates transmission of light from each laser into fiber-optic cabling 72 (FIG. 2A). Interface 70 may include one or more fixtures that position and hold an inlet end for each fiber-optic cable included in cabling 72 such that light output from the light source transmits into a fiber-optic cable. Interface 70 may also include optics that direct light from lasers into cabling 72. In one embodiment, a single fiber-optic cable is used in cabling 72 and fiber optic interface 70 includes a lens system disposed between the outlet of a lamp or each laser and the inlet of the single fiber-optic cable to direct light into the cable. The lens system may comprise at least two lenses: a first lens to direct the light towards the fiber entrance and a second lens that collimates light entering the cable. In another embodiment that implements a one-to-one laser to fiber-optic cable 72 relationship, fiber optic interface 70 holds the inlet end for each fiber-optic cable 72 relatively close to the outlet of each laser to receive light there from. Each cable in this case may include a converging lens at its inlet end that facilitates light capture and transmission into a cable. In another one-to-one design, each fiber-optic cable in cabling 72 includes a fixture that permits attachment to another object. For example, conventionally available fiber-optic cables available from vendors such as Ocean Optics Inc. of Dunedin, Fla. include a detachable fixture with a thread that allows screwing and fixing of the fiber-optic cable to a mating thread disposed on a laser housing. In this case, fiber-optic interface 70 comprises the threaded fixture from each cable and the mating thread on the laser.

In a single path embodiment where red, green and blue lasers transmits colored light to a single optical modulation device along a single fiber-optic cable 72, fiber-optic interface 70 receives colored light from each colored laser, in turn, according to timed control signals provided to the lasers by control circuitry 76. In a single path embodiment where a white light generating lamp transmits sequential colored light to a single optical modulation device within projection chamber 14 along a single fiber-optic cable 72, fiber-optic interface 70 receives colored light from integrator tunnel 95 and transmits the colors passively—and a color wheel controls sequential provision of colored light. Generally speaking, construction of fiber-optic interface 70 varies with the generation nature and arrangement of light source 64, as well as the light manipulation device immediately upstream in the light path from interface 70. For a lamp light source 64 configuration that transmits light through an integrator tunnel 95 and condensing lens 94 before light receipt by interface 70, interface 70 may be disposed at a focus of the condensing lens 94 to minimize interface 70 size. In this case, interface 70 may also include one or more lenses that straighten converging light for travel down fiber-optic cable 72.

Input/output circuitry 74 provides an interface between control circuitry 76 and one or more interfaces, or ports, 78 (FIG. 2A). Input ports 78 are configured to receive at least one cable, wire, or connector, such as a cable for transmitting a video signal comprising video data from a digital computing device. Common ports suitable for use with input ports 78 include ports that receive S video cable, 6-pin mini DIN, VGA 15-pin HDDSUB female, an audio cable, component RCA through an S-Video adaptor, composite video RCA cabling, a universal serial bus (USB) cable, fire wire, etc. Ports 78 may also include an audio output port for wired connection to speakers employed by a headphone or speaker system.

Control circuitry 76 provides control signals to components within base 12 and routes data from input/output circuitry 74 to appropriate components within display device 10. Thus, control circuitry 76 provides control signals to light source 64 that determine when light source 64 is turned on/off. In addition, circuitry 76 may include and access memory that stores instructions for the operation of components within display device 10. For example, circuitry 74 may provide control signals to control fans 24 according to stored heat regulation instructions. One or more sensors may also be disposed within base 12 to facilitate thermal regulation. For example, a temperature sensor may be disposed proximate to circuitry 74 and 76 to monitor temperature levels and participate in closed loop temperature control within base 12 as controlled by control circuitry 76.

Input/output circuitry 74 and input ports 78 collectively permit communication between display device 10 and a device that outputs a video signal carrying video data. For example, desktop computers, laptop computers, personal digital assistants (PDAs), cellular telephones, video game consoles, digital cameras, digital video recorders, DVD players, and VCRs, may all be suitable to output video data to display device 10. Video data provided to control circuitry 76 may be in an analog or digital form. In some cases, input/output circuitry 74 and control circuitry 76 convert analog video signals into digital video signals suitable for digital control of an optical modulation device included in display device 10, such as a liquid crystal display "LCD" device or a digital micromirror "DMD" device. Thus, input/output circuitry 74 or control circuitry 76 may also include support software and logic for particular connector types, such as processing logic required for S-video cabling or a digital video signal. Control circuitry 76 may also include and access memory that facilitates conversion of incoming data types and enhances video compatibility of display device 10. Suitable video formats having stored conversion instructions within memory accessed by control circuitry 76 may include NTSC, PAL, SECAM, EDTV, and HDTV (1080i and 720p RGBHV), for example.

When lasers 96 are used for light generation within light source 64 (FIG. 2C), control circuitry 76 receives video data included in a signal via one or more input ports 78 and input/output circuitry 74, converts the data to color frame sequential data, and synchronizes the frame sequential data for delivery to the optical modulation device 102 (FIG. 3A) and to each laser 96. In a single path design between lasers 96 and the optical modulation device where one optical fiber transmits red, green and blue light in a time controlled sequential order, this includes synchronizing the timing of data sent to the optical modulation device and on-off commands sent to lasers 96.

Power diode 80 (FIG. 2A) is electrical communication with an external power switch 82 (FIG. 1) and illuminates when display device 10 is turned on to indicate whether display device 10 is on or off.

Figure 3B:
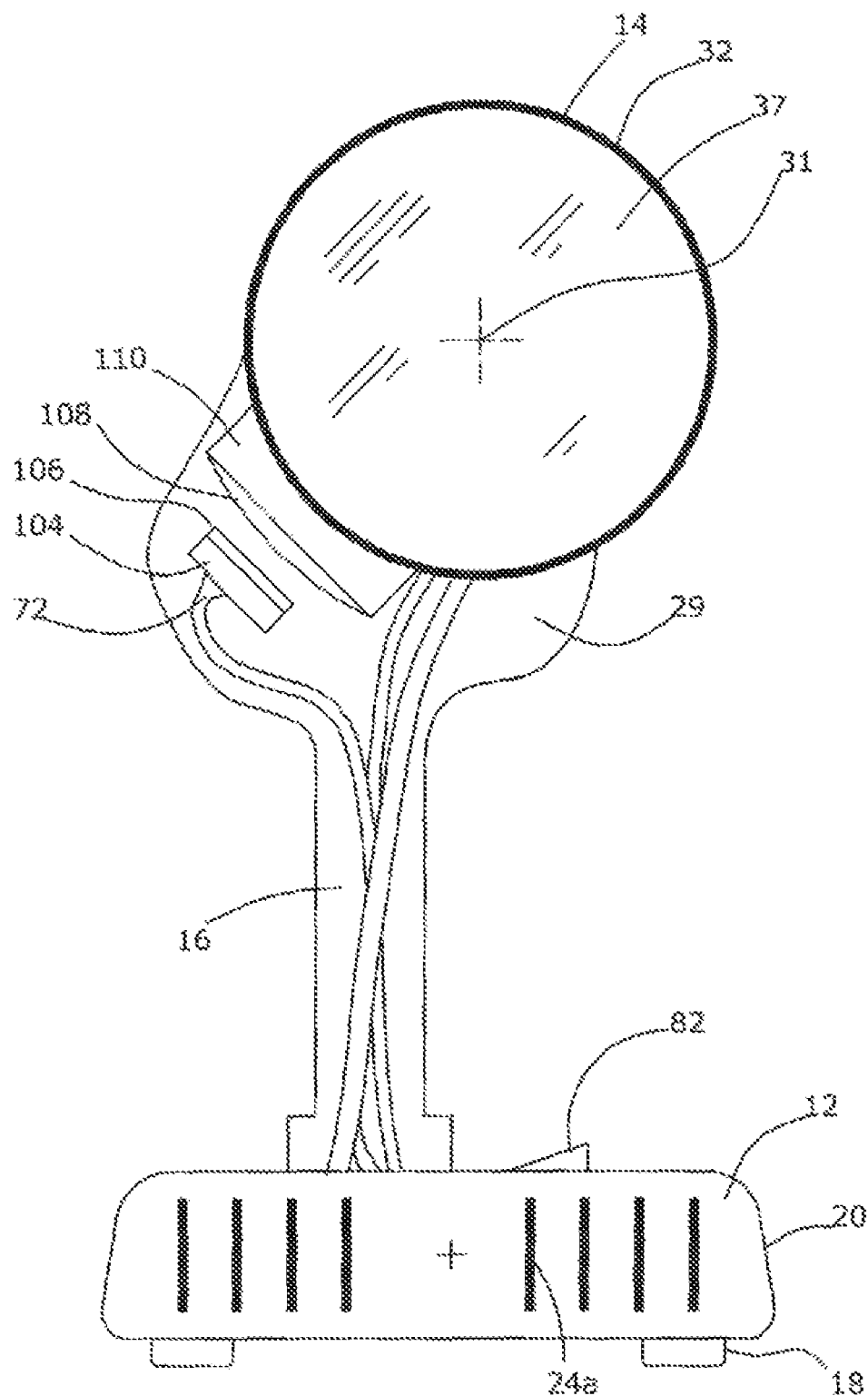
FIG. 3B shows a front view illustration of the display device of FIG. 1 with the positional interface and lower projection chamber cutaway to show components therein in accordance with one embodiment of the present invention.

FIG. 3A shows a simplified side view illustration of components within projection chamber 14 of FIG. 1, taken through a vertical midpoint of chamber 14 along its cylindrical axis, in accordance with one embodiment of the present invention. FIG. 3B shows a front view illustration of display device 10 with positional interface 16 and lower projection chamber 29 cutaway to show components therein. Projection chamber 14 comprises optical modulation device 102, fiber-optic interface 104, relay optics 106 and 108, prism structure 110, projection lens system 112, control and power cabling 120, and air duct 122.

Fiber-optic cable 72 attaches to a fiber-optic interface 104 and outputs light to relay optics 106. In one embodiment, fiber-optic interface 104 secures fiber-optic cable 72 such that slack is provided for fiber-optic cable between attachment at fiber-optic interface 104 and attachment within base 12. The slack allows fiber-optic cable 72 to deflect with positional interface 16 for various positions of projection chamber 14 relative to base 12.

Together, fiber-optic cable 72 and fiber-optic interface 104 direct light generated by light source 64 to prism 110. In one embodiment, fiber-optic cable 72 and interface 104 are configured with respect to prism 110 so as to provide an optical path of incident light that is about perpendicular to an incident surface of prism 110. Some digital micromirror light modulator designs require that incoming light be incident on the light modulator from either above or below its light reflecting surface to allow light output along output path 31. Interface 29 of projection chamber housing 32 and fiber-optic interface 104 ease this requirement and allow a designer to arrange fiber-optic cable 72 and fiber-optic interface 104 within interface 29 such that fiber-optic interface 104 directs light at a particular desired angle relative to prism 110, and onto optical modulation device 102. For example, fiber-optic interface 104 may be coupled to interface 29 to provide an incident light path that is perpendicular onto an incident surface of prism 110 and has a 45 degree angle relative to optical modulation device 102 (e.g., prism 110 is rotated 45 degrees about path 31). Attachment between interface 104 and housing 29 maintains the desired incoming light angle despite changing positions of fiber-optic cable 72 along its length caused by repositioning of positional interface 16.

Relay optics 106 and 108 convert light receive from fiber-optic cable 72 to light suitable for transmission into prism structure 110 and onto optical modulation device 102. This may include shaping and resizing light flux received from cable 72 using one or more lenses. When light source 64 comprises a lamp 91 and uses a downstream optical integrator 95 as illustrated in FIG. 2B, lens 106 is selected and arranged within interface 29 of projection chamber 14 to increase the area of light flux received from fiber-optic cable 72. Lens 108 is then selected and arranged to convert the divergent light transmitted by lens 106 into substantially parallel flux for transmission into prism 110 and onto optical modulation device 102.

In another embodiment, display device 10 comprises a pair of fly-eye lenses arranged in the optical path between light source 64 and prism 110. Cumulatively, the pair of fly-eye lenses uniformly distribute light received from fiber-optic cable 72 to the flux transmitted upon optical modulation device 102. In a specific embodiment, the pair of fly-eye lenses are arranged on either and a fiber-optic cable 72. The first fly-eye lens is disposed at fiber-optic interface 70 within base 12, receives light from a lamp or diode laser array, and spatially divides the entire input light flux into a set of blocks or components that each comprise a portion of the total area of the inlet flux. Light for each block or component then travels down its own fiber-optic cable 72. The second fly-eye lens comprises the same number of blocks or components and is disposed at relay lens 106. The second fly-eye lens receives a fiber-optic cable for each block or component, and outputs light for each component such that the light from each component is expanded to span the downstream dimensions of optical modulation device 102 and the projected image.

Prism structure 110 is an optical modulation system that provides light to optical modulation device 102 at predetermined angles. Prism structure 110 also transmits light from optical modulation device 102 to the projection lens system 112 along output path 31. Prism structure 110 comprises prism components 110a and 110b that are separated by air space or bonding interface 110c. Interface 110c is disposed at such an angle so as to reflect light provided from fiber-optic cables 72 (and intermittent relay optics) towards optical modulation device 102. In addition, interface 110c allows light reflected by optical modulation device 102 to transmit to projection lens system 112 along output path 31.

Optical modulation device 102 is configured to selectively transmit light to provide an output image along output light path 31. To do so, optical modulation device 102 is supplied with video data included in a video signal and selectively transmits light according to the video data. The video data is typically provided to device 102 on a frame by frame basis according to individual pixel values. If the video data is not received by display device 10 in this format, control circuitry 76 in base 12 may convert the video data to a suitable format for operation of optical modulation device 102. In one embodiment, individual light modulation elements within optical modulation device 102, which each correspond to an individual pixel on the output image, translate received digitized pixel values into corresponding light output values for each pixel.

In a specific embodiment, optical modulation device 102 is a mirror based optical modulation device, such as a digital micromirror device (or DMD, a trademark of Texas instruments Inc.) commercially available from Texas Instruments, Inc. In this case, optical modulation device 102 comprises a rectangular array of tiny aluminum micromechanical mirrors, each of which individually deflects about a hinged axis to selectively reflect output image light down output path 31, and reflect non-image light away from output path 31. The deflection state or angle of each mirror is individually controlled by changing memory contents of an underlying addressing circuit and mirror reset signal. The array of mirrors is arranged such that each mirror is responsible for light output of a single pixel in the video image. Control signals corresponding to pixel output are supplied to control electrodes disposed in the vicinity of each mirror, thereby selectively deflecting individual mirrors by electromagnetic force according to video data on a pixel by pixel basis. Light reflected by each mirror is then transmitted along output light path 31, through prism structure 110, and out of projection chamber 14 using projection lens system 112.

A controller 114 is included with optical modulation device 102 and provides control electrical signals that direct each micromechanical mirror to desired light reflecting states corresponding to pixel video data for each pixel. Control and power cabling 120 provides electrical communication between controller 114 and control circuitry 76 in base 12 (FIG. 2A). Thus, at least one electrical connector included in cabling 120 couples to controller 114 in projection chamber 14 and to control circuitry 76 in base 12 and provides electrical communication there between. A power line within cabling 120 extends between optical modulation device 102 in projection chamber 14 and power supply 66 in base 12 and provides power from power supply 66 to device 102. Control and power cabling 120 then travels through positional interface 16, which includes one or more holes or apertures that allow connector 120 to pass there through without impingement on cabling 120 for any position of projection chamber 14. In one embodiment, cabling 120 passes through a plastic tube in positional interface 16 to further protect the wires.

The illumination angles for optical modulation device 102 are set by the output direction of fiber-optic interface 102, arrangement of relay optics 106 and 108, and the faces of prism structure 110. After light reflection by individual mirrors of optical modulation device 102, reflected light exits prism structure 110 towards lenses 112 along output optical path 31.

Vents 118 are disposed on an aft portion of housing 32 proximate to optical modulation device 102. An air duct 122 includes a high-pressure end proximate to optical modulation device 102 and controller 114, and a low pressure end disposed within base 12 (see also duct 210 of FIG. 4A). As mentioned above with respect to FIG. 2A, fans 62 draw air from within base 12 and exhaust the air out exhaust vents 24b, which creates a negative pressure within base 12 relative to the ambient room or surroundings. Correspondingly, fans 62 create a negative pressure for the end of duct 122 within base 12 relative to the opposite end in projection chamber 14, which would otherwise rest at room pressure due to vents 118. By disposing one end of air duct 122 within base 12 and the other end in a space 125 around optical modulation device 102, fans 62 thus draw air from a space 125 and cool optical modulation device 102. Cumulatively, cooling air is drawn from the ambient surroundings around projection chamber 14, through vents 118 and into a space 125 surrounding optical modulation device 102, into duct 122 at end 122a, through duct 122, out duct 122 at end 122b, into base 12, and out air vents 24b. Continually running fans 62 maintains end 122b at a low pressure relative to end 122a, and thus provides continual cooling for optical modulation device 102.

Figure 4A:
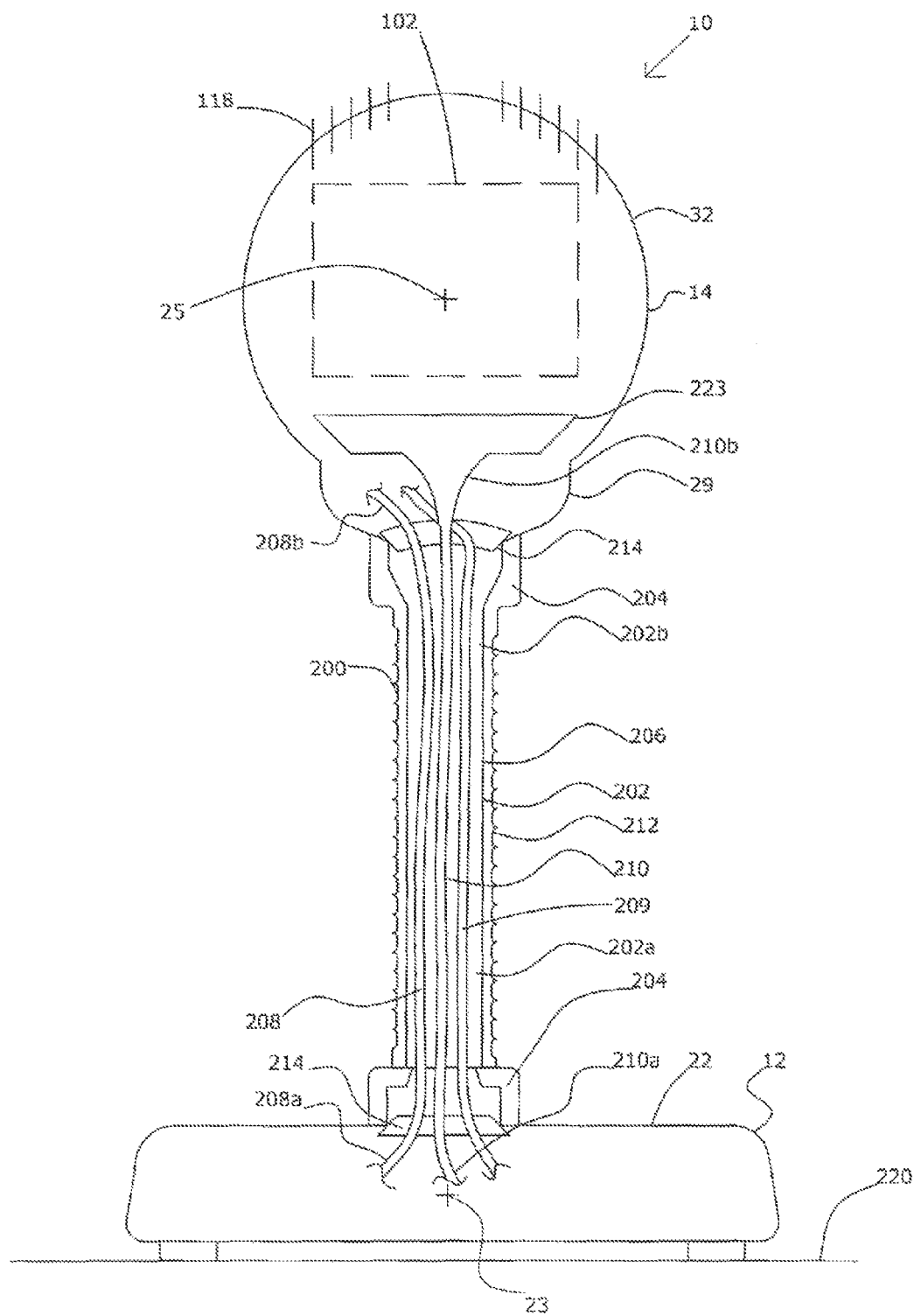
FIG. 4A illustrates a positional interface comprising a bendable tubing in accordance with one embodiment of the present invention.

Either end of duct 122 may include an opening or aperture that facilitates cooling of optical modulation device 102 and air flow within display device 10. For example, end 122a may include a rectangular and elongated opening 223 that spans the width of optical modulation device 102 (FIG. 4A). In addition, end 122b may include a large funnel opening that increases the air outlet area 122b within base 12. This large opening increases airflow in duct 122 and increases air removal from space 125 in projection chamber 14. In one embodiment, end 122b has a larger opening than end 122a. When a rectangular opening for end 122a is disposed relatively close to controller 114 and optical modulation device 102, and on a bottom side of projection chamber 14 relative to top vents 118, downward vertical flow across the entire width of optical modulation device 102 and controller 114 may result. Further, as will be discussed with respect to FIG. 4A, duct 122 may also include a valve controlled by control circuitry 76 that closes duct 122 when fans 62 are not in use to prevent hot air from base 12 from flowing to projection chamber 14.

In another embodiment, heat dissipation for optical modulation device 102 includes one or more heat sinks in heat conduction communication with metal components of optical modulation device 102. For example, a heat channel comprising metal or another high conduction material may contact metal components of optical modulation device 102 and transmit heat generated by optical modulation device 102 to another metallic structure within display device 10, such as projection chamber housing 32 (when comprised of metal) or a corrugated metal tubing included in positional interface 16 (FIG. 4A).

Output projection path 31 (FIG. 3A) characterizes: a) the direction of image light selectively transmitted by optical modulation device 102 within projection chamber 14, and b) the direction of light output from projection chamber 14. Within chamber 14, path 31 extends as a straight line from optical modulation device 102 for elements in their 'on' state, through prism structure 110, and out projection lens 37.

A projection lens system 112 is disposed along output path 31 for outputting light transmitted by the optical modulation device along path 31. Projection lens system 112 manipulates image light transmitted by optical modulation device 102 along output path 31 such that a projected image cast on a receiving surface enlarges as distance from output lens 37 to the receiving surface increases. Projection lens system 112 comprises lenses 112a, 112b, 112c and external lens 37, each of which are disposed centrically along and orthogonal to output light path 31. Distances between each lens 112 may vary with a desired splay angle from output lens, as may the number of lenses 112 used. In one embodiment, display device 10 is designed for a short throw distance, such as between about six inches and about 15 feet. Display device 10 may also include one or more buttons or tools that allow a user to manually focus and manually zoom output from projection lens system 112. Projection chamber 14 may also include a lens between optical modulation device 102 and prism 110 that converges image light reflected by device 102 towards output optical path 31. This allows a reduction in output lens 112 diameters, and a corresponding reduction in diameter and size for projection chamber 14.

Although the present invention has been described primarily so far with respect to a display device that employs a reflective light modulator of a digital micromirror design in a single light path system, the present invention may also employ other types of light modulators and light path designs. For example, fiber-optic cables 72 may be arranged for a multiple light path design to transmit light to three primary color dedicated LCD optical modulators, or to three primary color dedicated DMD optical modulators. In the case of an LCD optical modulation device, selective transmission of light comprises selective passage of light through a liquid crystal medium on a pixel by pixel basis.

In addition, although base 12 of FIG. 1 has been primarily described with respect to components dedicated to projection functionality, it is understood that base 12 may be inclusive in a larger system, or comprise components not directed solely to display device 10 output. For example, base 12 may be part of a computer housing that includes components for projection functionality and components for computer functionality in a computer system, such as a desktop computer. Computer functionality components may include a processor, a hard drive, one more interface and control boards, a disk or floppy drive, etc. In this case, housing 20 is considerably larger to accommodate the combined functionality and components. In addition, some components may be shared, such as a power supply and fans used for movement of air within the housing.

FIG. 4A illustrates a cutaway front view of a positional interface 200, taken through a vertical midplane of a bendable corrugated tubing 202 and showing select internal components of display device 10 to facilitate discussion, in accordance with one embodiment of the present invention.

Positional interface 200 allows a user to deflect bendable tubing 202 and position projection chamber 14 when a threshold force or greater is applied to the tubing. Interface 200 also maintains a constant position between projection chamber 14 and base 12 when the threshold force is not applied. The threshold force may be applied either directly to tubing 202 or indirectly to tubing 202, e.g., via manipulation of projection chamber 14 relative to base 12. In one embodiment, the threshold force is greater than a maximum force transmitted onto bendable tubing 202 by the weight of projection chamber 14 for any position of the projection chamber. This allows positional interface 200 to hold a desired position of projection chamber 14 during usage without movement of the projected image. In addition, the threshold force may be increased by a buffer factor to achieve robust support of projection chamber 14, or to achieve a desired compliance and resistance for user interaction.

Mechanical design and assembly of positional interface 16 establishes the threshold force. Bendable corrugated tubing 202 is strong enough to hold a position for projection chamber 14, while compliant enough for a user to bend tubing 202 to achieve a desired position and orientation for projection chamber 14. Bendable tubing 202 is hollow on its inside and includes an inner channel 206. Corrugated aluminum shielding or armor used in the protection of electrical wiring and available from a variety of vendors is well suited for use as bendable corrugated tubing 202. The dimensions of tubing 202 depend on the tubing material and construction. In one embodiment, bendable tubing is made of a metal such as aluminum and has an outer diameter between about 0.25 inches and about 0.75 inches. An outer diameter of 0.5 inches is suitable for display device 10 of FIG. 1.

A lower end 202a of bendable tubing 202 couples to a top surface 22a of base 12. Specifically, lower end 202a of bendable tubing 202 is coupled to base 12 proximate a center of mass 23 for base 12. An upper end 202b of tubing 202 couples to receiving interface 29 of projection chamber 14. Similarly, upper end 202b of bendable tubing 202 couples to projection chamber 14 proximate to a center of mass 25 for projection chamber 14. As described above with respect to FIG. 1, coupling bendable tubing 202 to the center of mass for both projection chamber 14 and base 12 minimizes moments produced by positioning of projection chamber 14 away from the center mass of base 12. Coupling between two objects as described herein is meant in its broadest sense and may comprise, for example, joining, permanent or semi-permanent attachment, mechanical linkage between the two objects, fastening together using a screw or similar fastening instruments, connection via a coupler such as a moveable joint or hinge, and coupling through intermediary components. In one embodiment, ends 202a and 202b detachably screw into housing 20 of base 12 and receiving interface 29 of projection chamber 14, respectively.

In another embodiment, positional interface 200 includes an intermediary attachment collar 204 disposed at either end of tubing 202. Collar 204 is a rigid structure that facilitates permanent attachment between bendable tubing 202 and base 12 (or projection chamber 14), and also increases structural support for longer tubing 202. Collar 204 may comprise a suitably rigid material or metal such as a rigid plastic or aluminum. In the case where both tubing 202 and collar 204 are made of aluminum, tubing 202 inserts within an inner diameter of collar 204 and is fixed therein by stamping collar 204 on opposite sides. For rigid plastic composition, tubing 202 may be glued to collar 204. Screwing threads may also be used for attachment between bendable tubing 202 and base 12 (or projection chamber 14). Bottom or top collar 204 may extend a percentage of the length of tubing 202 to increase strength and height for positional interface 200. For example, bottom collar 204 may extend from about 10 percent to about 60 percent of the height of tubing 202 and collar 204 combined.

A plastic sleeve 212 is disposed circumferentially outside bendable tubing 202 along the entire length of tubing 202. Plastic sleeve 212 is used for aesthetic purposes and matches the color for housing 32 of projection chamber 14 and housing 20 of base 12. In another embodiment, plastic sleeve 212 is not used and bendable tubing 202 is matched in color to housing 32 and housing 20.

Channel 206 extends inside of tubing 202 from lower end 202a to upper end 202b. Channel 206 is suitably sized to receive fiber-optic cable 208, electrical connectors 209, and air duct 210. Fiber optic cable 208 passes through channel 206 and has a first end 208a in base 12 and a second end 208b in projection chamber 14. Electrical connectors 209 provide electrical and digital communication between components within projection chamber 14 and components within base 12, such as digital communication between optical modulation device 102 and control circuitry 76. Air duct 210 also passes through channel 206 and has a first end 210a in base 12 and a second end 210b in projection chamber 14. In one embodiment, fiber-optic cable 208, electrical connectors 209, and air duct 210 are designed and arranged with enough slack to allow movement of projection chamber 14 without placing potentially harmful tensions on cable 208, connectors 209, and duct 210 for any position of projection chamber 14. A plastic or rubber sleeve 214 is disposed on the inside ends of channel 206 and prevents fiber-optic cable 208, electrical connectors 209, and air duct 210 from impingement on pointed corners at either end channel 206.

As shown in FIG. 4A, a top end of air duct 223 is expanded to a thin rectangular profile that increases of the top inlet area of air duct 210 and matches the width of optical modulation device 102. In operation, fans 62 within base 12 create a negative pressure at the bottom end 210a that draws air in through the top end 210b and rectangular profile 223 according to its increased inlet area, which spans the width of optical modulation device 102. With vents 118 disposed in housing 32 on the top side of optical modulation device 102, this creates a cooling air flow across the entire surface of device 102. During non-usage when display device 10 is upright, vents 118 also allow hot air in the vicinity of optical modulation device 102 to rise and escape from projection chamber 14, thereby providing passive cooling of optical modulation device 102 during non-usage.

In one embodiment, bendable tubing 202 is relatively long and allows projection chamber 14 to be pointed down onto a surface 220 that base 12 rests upon, such as a table. This allows display device 10 to be used in environments such as libraries and coffee shops where a user has table space but not wall space. A tubing 202 length between about one inch and about twenty-four inches is suitable for many applications. In a surface usage embodiment, bendable tubing 202 has a length between about six inches and about twenty-four inches. In another specific embodiment, bendable tubing 202 has a length between about two inches and about six inches.

Figure 6A:
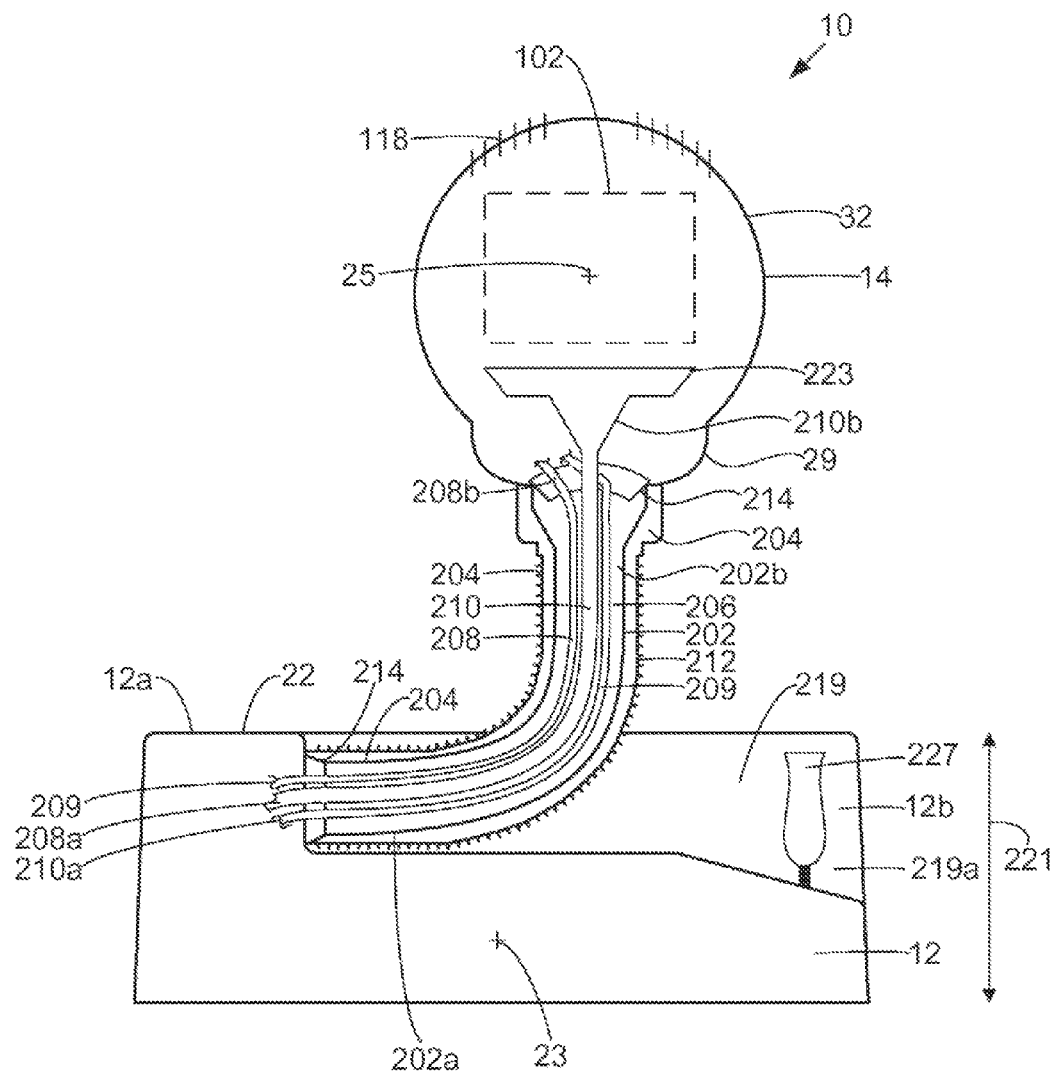
FIG. 6A illustrates a cutaway side view of a positional interface comprising a bendable tubing in accordance with one embodiment of the present invention.
Figure 6B:
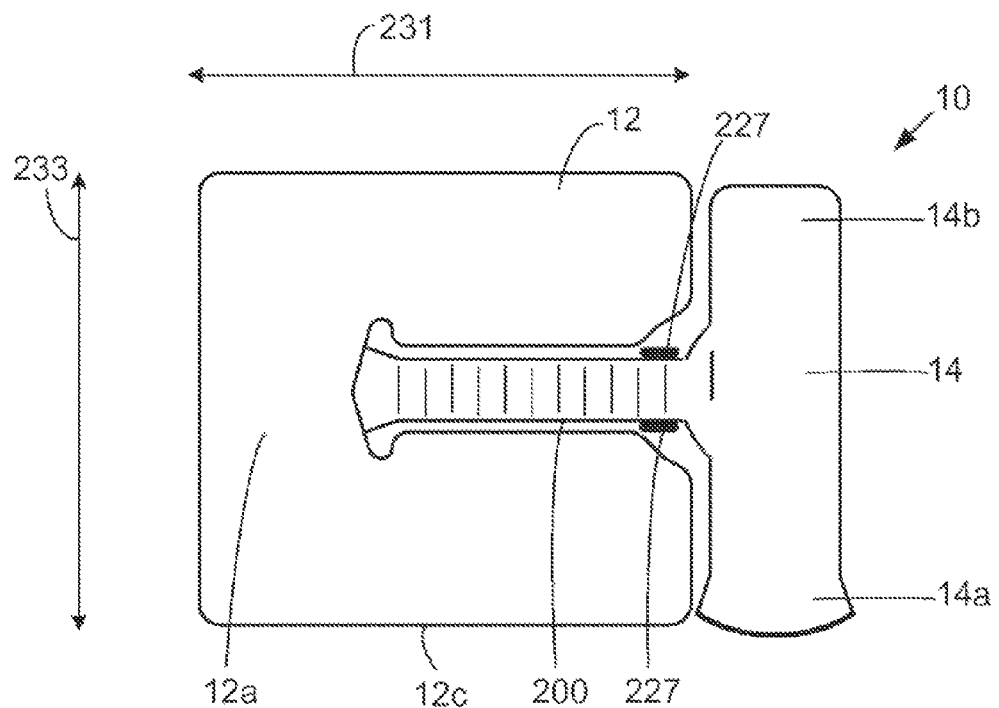
FIG. 6B illustrates a top view of the display device of FIG. 6A with its projection chamber in a collapsed position when video output is not projected.
Figure 6C:
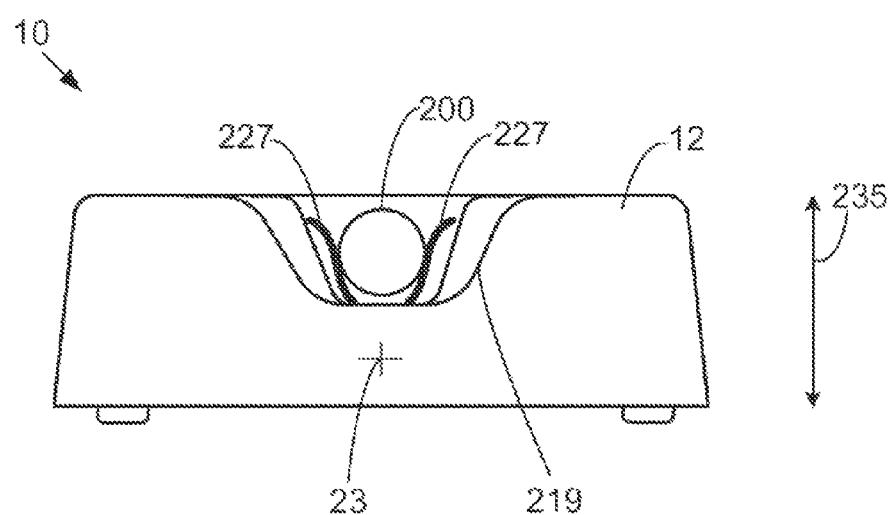
FIG. 6C illustrates a front view of the display device base of FIG. 6A with the bendable tubing removed to show the portions of the base for the receiving tubing.

FIG. 6A illustrates a cutaway side view of a positional interface 200, taken through a vertical midplane of a bendable tubing 202 and showing select internal components of display device 10 to facilitate discussion, in accordance with another embodiment of the present invention. FIG. 6B illustrates a top view of display device 10 and positional interface 200 with projection chamber 14 in a collapsed position. FIG. 6C illustrates a front view of base 12 with bendable tubing 202 removed to show the portions of base 12 for receiving tubing 202.

Positional interface 200 allows a user to position projection chamber 14 relative to base 12 and comprises bendable tubing 202. Referring to FIG. 6A, a lower end 202a of tubing 202 couples to base 12 while an upper end 202b of tubing 202 couples to receiving interface 29 of projection chamber 14. Bendable tubing 202 allows a user to position projection chamber 14 relative to base 12 when a threshold force or greater is applied to the tubing, and is similar to that described above with respect to FIG. 4A.

The position of projection chamber 14 shown in FIG. 6A is suitable for use when projecting video output. It is understood that a user may bend and twist bendable tubing 202 to change the direction of projected video output from projection timber 14 relative to base 12, thereby relocating the projected video output. For example, the user may twist bendable tubing to change the direction of video output from the front 12b of base 12 to the side 12c of base 12, or vice versa.

FIG. 6B illustrates display device 10 and positional interface 200 in a collapsed position. The collapsed position is suitable for use when projecting video output and suitable when video output is not projected. When projecting video output in the collapsed position, display device 10 somewhat resembles the flat profile of a traditional cinder block projector design—but allows simple positioning of projection chamber 14 and corresponding projected output by bending or twisting bendable tubing 202. When not projecting video output in the collapsed position, display device 10 provides a flat profile that is suitable for transport, storage, or placement into a protective carrying apparatus.

To facilitate the collapsed position shown in FIG. 6B, base 12 includes a recessed channel 219. Recessed channel 219 at least partially receives bendable tubing 202 and interface 29 of projection chamber 14 such that the profile or height of display device 10 is lower when projection chamber 14 and tubing 202 are in the collapsed position. The lower profile simplifies display device 10 storage and transport. In one embodiment, channel 219 includes a height 221 (FIG. 6A) that fully receives tubing 202. In addition, channel 219 includes an expansive opening 219a at the front end 12b of base 12 that receives interface 29 of projection chamber 14. The expansive opening 219a is dimensioned to accommodate the shape of interface 29, thereby providing a lower profile the collapsed position shown in FIG. 6B.

Display device 10 may also include a clamp or receiving collar 227 that receives bendable tubing 202 when in the collapsed position. The collar may comprise two semi-compliant plastic clips dimensioned and arranged to receive and press around tubing 202 when inserted therein, and thereby provide a holding force for tubing 202 when in the collapsed position that maintains the collapsed position, e.g., during transport.

As shown in FIGS. 6A and 6B, bendable tubing 202 couples to base 12 towards an aft end 12a of base 12. Location of channel 219 at one end of base 12 permits channel 219 to span a large portion of the length 231 (FIG. 6B) for base 12 and receive the entire length of tubing 202 and projection chamber 14 in the collapsed position, thereby decreasing the length of display device 10 in the collapsed position, which is useful during transport and to increase portability of device 10.

In another embodiment, bendable tubing 202 couples to base 12 such that the forward and aft ends of projection chamber 14 align with, or contained within, the side dimensions of base 12. Thus, if tubing 202 couples to projection chamber 14 away from a midpoint between the forward and aft ends 14a and 14b of projection chamber 14, similar offset is used in the coupling between tubing 202 and base 12 in width direction 233 (FIG. 6B) such that the forward and aft ends 14a and 14b of projection chamber 14 align with the sides of base 12. In a specific embodiment, base 12 has a width 233 that is greater than a length of projection chamber 14 from forward end 14a to aft end 14b. In this case, ends of projection chamber 14 are within the dimensions of each side of base 12 when projection chamber 14 is in the collapsed position. Maintaining a profile on both sides of base 12 without extension of projection chamber 14 outside of either side of base 12 simplifies transport and storage, e.g., in a protective carrying apparatus, of display device 10 when in the collapsed position and when video output is not projected.

In one embodiment, projection chamber 14 is substantially cylindrical and base 12 has a height 235 (FIG. 6C) greater than or about equal to the diameter of projection chamber 14. Again, when in the collapsed position of FIG. 6B, this dimensioning simplifies transport and storage of display device 10 when video output is not projected.

Figure 4B:
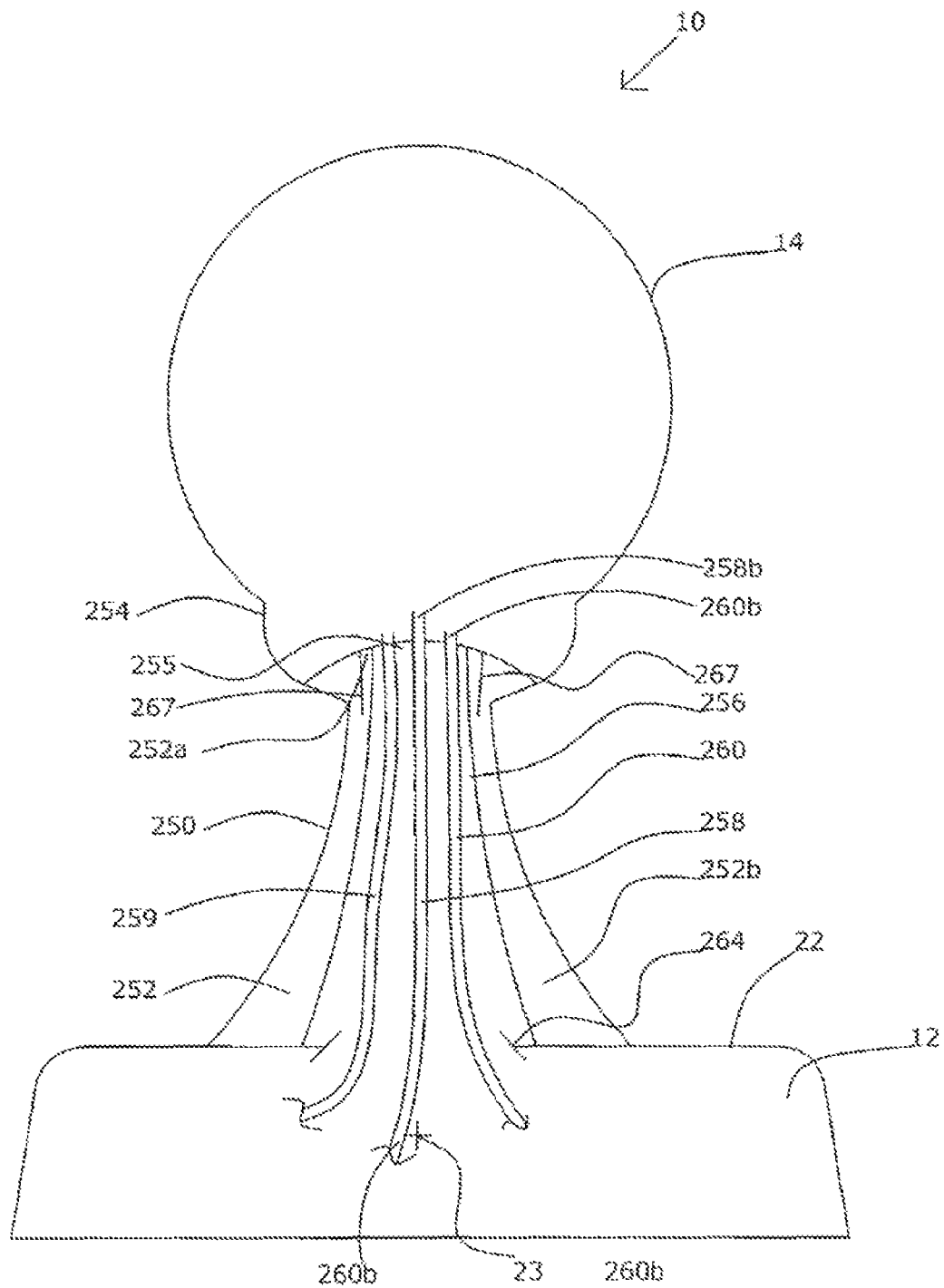
FIG. 4B illustrates a cutaway front view of a display device and a ball and socket positional interface in accordance with another embodiment of the present invention.

FIG. 4B illustrates a cutaway front view of display device 10 and a positional interface 250, showing select internal components to facilitate discussion, in accordance with another embodiment of the present invention. Interface 250 comprises a ball 252 and socket 254 combination that permits relative rotational movement between projection chamber 14 and base 12.

Ball 252 includes a ball portion 252a and a coupling portion 252b. Coupling portion 252b is a rigid member fixed to base 12 on one end and to ball 252a on the other end. Coupling portion 252b provides clearance for projection chamber 14 so projection chamber 14 does not collide with base 12. In one embodiment, coupling portion 252b attaches to housing 20 of base 12 proximate a center of mass 23 for base 12. Socket 254 attaches to projection chamber 14 and couples to housing 32 of projection chamber 14 at receiving interface 29. In one embodiment, socket 254 attaches to housing 32 proximate to a center of mass 25 for projection chamber 14. As described above, coupling ball 252 and socket 254 to the center of mass for both projection chamber 14 and base 12 minimizes any moments produced by positioning of projection chamber 14. While the embodiment in FIG. 4B illustrates coupling of ball 252 to base 12 and coupling of socket 254 to projection chamber 14, it is understood that the two may be switched and ball 252 coupled to projection chamber 14 while socket 254 is coupled to base 12.

Ball 252 cooperates with socket 254 to allow projection chamber 14 to be moved relative to base 12 and allow projection chamber 14 to maintain a constant position relative to base 12 after being moved. Ball 252 and socket 254 thus provide two rotational degrees of freedom between projection chamber 14 and base 12.

Socket 254 includes an inner receiving surface that matches outer surface dimensions of ball 252. Dimensioning between the two surfaces is such that ball 252 and socket 254 a) allow rotational movement between the two surfaces and allow a user to position projection chamber 14 when a threshold force or greater is applied to the ball and socket, and b) provide sufficient resistance between the two surfaces to hold projection chamber 14 at a desired position. Thus, when the threshold force is not applied, ball 252 and socket 254 maintain a constant position between projection chamber 14 and base 12. In operation, a user typically operates the two-degree of freedom joint by manually moving projection chamber 14 while holding base 12. Similar to design and configuration of tubing 202, the threshold force for ball 252 and socket 254 is greater than a maximum force transmitted onto ball 252 and socket 254 by the weight of projection chamber 14 for any position of the projection chamber. This allows positional interface 250 to hold projection chamber 14 during usage without movement of the projected image. In addition, the threshold force may be increased by a buffer factor to achieve robust support of projection chamber 14 without drift; or to achieve a desired resistance for user interaction.

Ball 252 and socket 254 also comprises an inner channel 256. Channel 256 extends inside ball 252 and socket 254 from socket 254, through the top of ball portion 252a, to the bottom of coupling portion 252b, and into base 12. Channel 256 is suitably sized to receive fiber-optic cable 258, electrical connectors 259, and air duct 260. Fiber optic cable 258 passes through channel 256 and has a first end 258a in base 12 and a second end 258b in projection chamber 14. Electrical connectors 259 pass through channel 256 and provide electrical and digital communication between components within projection chamber 14 and components within base 12. Air duct 260 also passes through channel 256 and has a first end 260a in base 12 and a second end 260b in projection chamber 14. In one embodiment, cable 258, connectors 259, and duct 260 are designed and arranged with enough slack to allow movement of projection chamber 14 without placing potentially harmful stresses on cable 208, connectors 209, and duct 210 for any position of projection chamber 14. A plastic or rubber sleeve 264 is disposed on inside edges of channel 256 and prevents cable 258, connectors 259, and duct 260 from impingement on pointed corners at the lower end channel 206.

Channel 256 opens to a top opening 255 of ball 252. Mechanical limit walls 267 are attached to socket 254, and extend down from socket 254 into top opening 255. The mechanical limits 267 are disposed cylindrically within top opening 255 and cooperate with inner walls of channel 256 to set limits for displacement between ball 252 and socket 254. In other words, limit walls 267 restrict the range of motion for ball 252 and socket 254. A cylindrical opening within mechanical limit walls 267 is configured large enough to receive fiber-optic cable 258, electrical connectors 259, and air duct 260 without impingement for any position of socket 254 relative to ball 252. Mechanical limit walls 267 may also be rounded or designed to prevent fiber-optic cable 208, electrical connectors 209, and air duct 210 from impingement on pointed corners of ball 252 and socket 254.

In one embodiment, socket 254 is disposed as a portion of receiving interface 29 and housing 32 of projection chamber 14. In this case, coupling of a top end of fiber-optic cable 258 to relay optics occurs within socket 254/receiving interface 29.

Figure 4C:
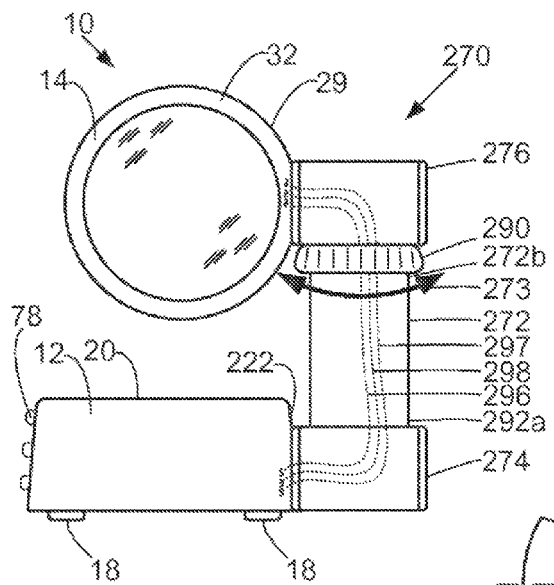
FIGS. 4C-F illustrate front, side and top views, respectively, of a display device and a dual hinge joint positional interface in accordance with another embodiment of the present invention.
Figure 4D:
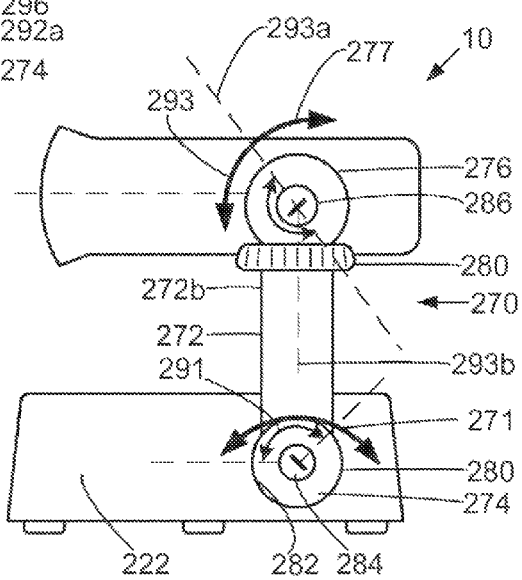
Figure 4E:
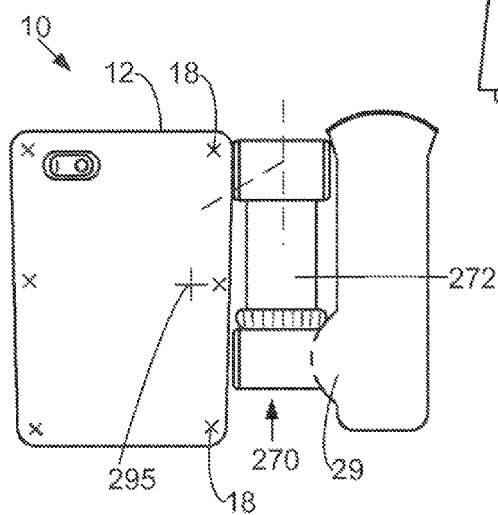
Figure 4F:
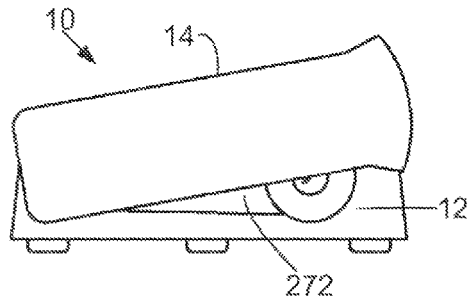

FIGS. 4C, 4D, 4E, and 4F illustrate external front, side, top, and side views, respectively, of a display device 10 including a positional interface 270 in accordance with another embodiment of the present invention. FIG. 4D illustrates display device 10 when arm 272 is elevated, while FIG. 4F illustrates display device 10 when arm 272 is lowered. Positional interface 270 allows projection chamber 14 to be moved relative to base 12 and allows projection chamber 14 to maintain a constant position relative to base 12 after being moved. Interface 270 comprises an arm 272, joint 274, joint 276, and wrist joint 280.

Arm 272 is a substantially rigid member having a first end 272a and a second end 272b. Arm 272 is long enough to provide clearance for projection chamber 14 above base 12 such that projection chamber 14 may rotate and re-position without interference from base 12. A molded plastic or hollow metal is suitable for material use with arm 272. In one specific embodiment, arm 272, housing 32 of projection chamber 14 and housing 20 of base 12 are made from a semi-transparent molded plastic.

Joint 274 couples the first end 272a of arm 272 to a side wall 222 of base 12 and allows rotation and movement between arm 272 and base 12. More specifically, arrow 271 illustrates the rotation provided by joint 274, which allows rotation of arm 272, joint 276 and projection chamber 14 about an axis perpendicular to a side of base 12 (FIG. 4D). In one embodiment, joint 274 comprises an outer cylindrical sleeve 282 that rotates about an inner cylindrical axle 284. Outer cylindrical sleeve 282 and inner cylindrical axle 284 are sized and press fit together in assembly of display device 10 such that inner cylindrical sleeve 282 press fits into outer cylindrical axle 284. The press fit and dimensioning of sleeve 282 and axle 284 is such that a user may move arm 272 relative to base 12 when a threshold force or greater is applied by the user to arm 272. In addition, the press fit provides sufficient resistance between the sleeve 282 and axle 284 surfaces to hold projection chamber 14 at a desired position when the threshold force is not applied. In one embodiment, the threshold force for sleeve 282 and axle 284 is greater than a maximum force transmitted onto joint 274 by the weight of projection chamber 14 for any position of the projection chamber. This allows positional interface 270 to hold a position of projection chamber 14 during usage without moving the projected image.

In another embodiment, joint 274 uses an adjustable screw 284 that allows a user to change a holding force provided by joint 274 between arm 272 and base 12 (FIG. 4D). Turning screw 284 clockwise tightens joint 274 and increases the holding force on arm 272, while turning screw 284 counter-clockwise loosens joint 274 and decreases the holding force. In one embodiment, the holding force provided by screw 284 is proportional to the rotational position of screw 284. In another embodiment, screw 284 includes a number of distinct holding states, such as: a) a first state that provides a holding force that is greater than a maximum force transmitted onto arm 272 by the weight of projection chamber 14 for any position of projection chamber 14, and b) a second state that allows arm 272 to be moved relative to base 12.

Joint 276 couples the second end 272b of arm 272 to projection chamber 14 and allows rotational movement between arm 272 and projection chamber 14. More specifically, arrow 277 illustrates the rotation provided by joint 276, which allows rotation of projection chamber 14 about an axis perpendicular to a side of projection chamber 14 (FIG. 4D). In one embodiment, joint 276 comprises an outer cylindrical sleeve and inner cylindrical axle similar to that described above with respect to joint 274. In another embodiment, joint 276 comprises an adjustable screw 286 similar to screw 284 described above. With either arrangement, joint 276 allows projection chamber 14 to be moved relative to base 12 when a threshold force has been applied to joint 276, and allows projection chamber 14 to maintain a constant position relative to base 12 when the threshold force is not applied and after being moved. Although joints 274 and 276 are described with respect to two specific arrangements, it is understood that other hinged joints, flexures and angular joint designs are known to those skilled in the art and may be used.

In one embodiment, positional interface 270 also includes a wrist joint 290 that permits rotation of projection chamber 14 and arm 272 about axis that passes through arm 272. Arrow 273 illustrates the rotation provided by joint 290, which allows rotation and positioning of joint 276 and projection chamber 14 about arm 272 (FIG. 4C). Joint 290 comprises an outer screw that allows user to manually tighten joint 290 for holding a desired position and loosen joint 290 for acquiring a desired position. As shown, wrist hinge 290 is disposed at the second end 272b of arm 272. Joint 290 may also be placed elsewhere along arm 272, such as the midpoint of arm 272 or first end 272a.

Although positional interface 270 is illustrated with three joints 274, 276 and 290, two joints are also possible. For example, joint 290 may be omitted from the design, leaving joints 274 and 276 as the two operational joints to move and position projection chamber 14. In another dual joint positional interface 270 embodiment, positional interface 270 is disposed on a top wall or surface of base 12 and joint 274 is not used, while joint 290 is disposed at the top wall or surface. This creates a two joint system where joint 290 permits rotation of arm 272 relative to the base 12 about a vertical axis perpendicular to the top surface, and joint 276 permits rotation of projection chamber 14 relative to arm 274 about an axis perpendicular to arm 272. This design is suitable for use with a computer system where a computer tower or similar structure acts as base 12. The computer system comprises computer system components within base 12; and positional interface 270 is then arranged on an upper portion of the computer tower.

Mechanical stops may be implemented for one or more joints of positional interface 270 to limit range of motion for each joint. As shown in FIG. 4D, joint 274 includes a 135 degree range of motion 291 defined by mechanical stops included within joint 274. At one end of range of motion 291, arm 272 is parallel to a bottom surface of base 12 (FIG. 4E). At the other end of range of motion 291, arm 272 allows positioning of projection chamber above base 12. In one embodiment, joint 276 includes a 180 degree range of motion 293, as shown in FIG. 4D. The first 135 degrees allow protection chamber 14 to travel from upward pointing angle 293a to an angle 293b that is parallel to arm 272. Before projection chamber 14 and joint 276 are rotated to angle 293b, wrist joint 290 may be used to rotate joint 276 and projector 14 such that projection chamber 14 is on an opposite side of arm 272 than base 12. This allows display device 10 to be collapsed to a flat profile as shown in FIG. 4E, e.g., for travel. In this position, display device 10 may be used on a flat surface as would a conventional cinder block projector. Since projection chamber 14 is upside-down in FIG. 4E relative to its orientation in FIG. 4C, software included with display device 10 may allow a user to vertically flip an output image from projection chamber 14. The remaining 45 degrees of joint 276 allow protection chamber 14 to be rotated upwards when used in the position shown in FIG. 4E, as shown in FIG. 4F.

Cumulatively, the three joint positional interface 270 thus cooperate to provide a) a first position for projection chamber 14 that is above base 12 when base 12 rests on a flat surface, and b) a second position for projection chamber 14 that is beside base 12 when the base rests on the flat surface. To prevent tipping for the embodiment shown in FIGS. 4E and 4F, display device 10 may be designed, and internal components within base 12 arranged, such that the center of mass 295 display device 10 is within a stability space provided by high friction pads 18 included in the bottom of base 12.

Similar to the design shown in FIGS. 4A and 4B, positional interface 270 comprises an air duct 296, electrical connectors 297 and fiber optic cable 298 that pass from base 12, through joint 274, through arm 272, through joint 276, and into projection chamber 14. In one embodiment, slack is given to duct 296, connectors 297 and cable 298 to permit the motion between projection chamber 14 and base 12. In another embodiment, duct 296 and connectors 297 are spiraled similar to a telephone wire used between a headset and base to permit the motion between projection chamber 14 and base 12.

Figure 5A:
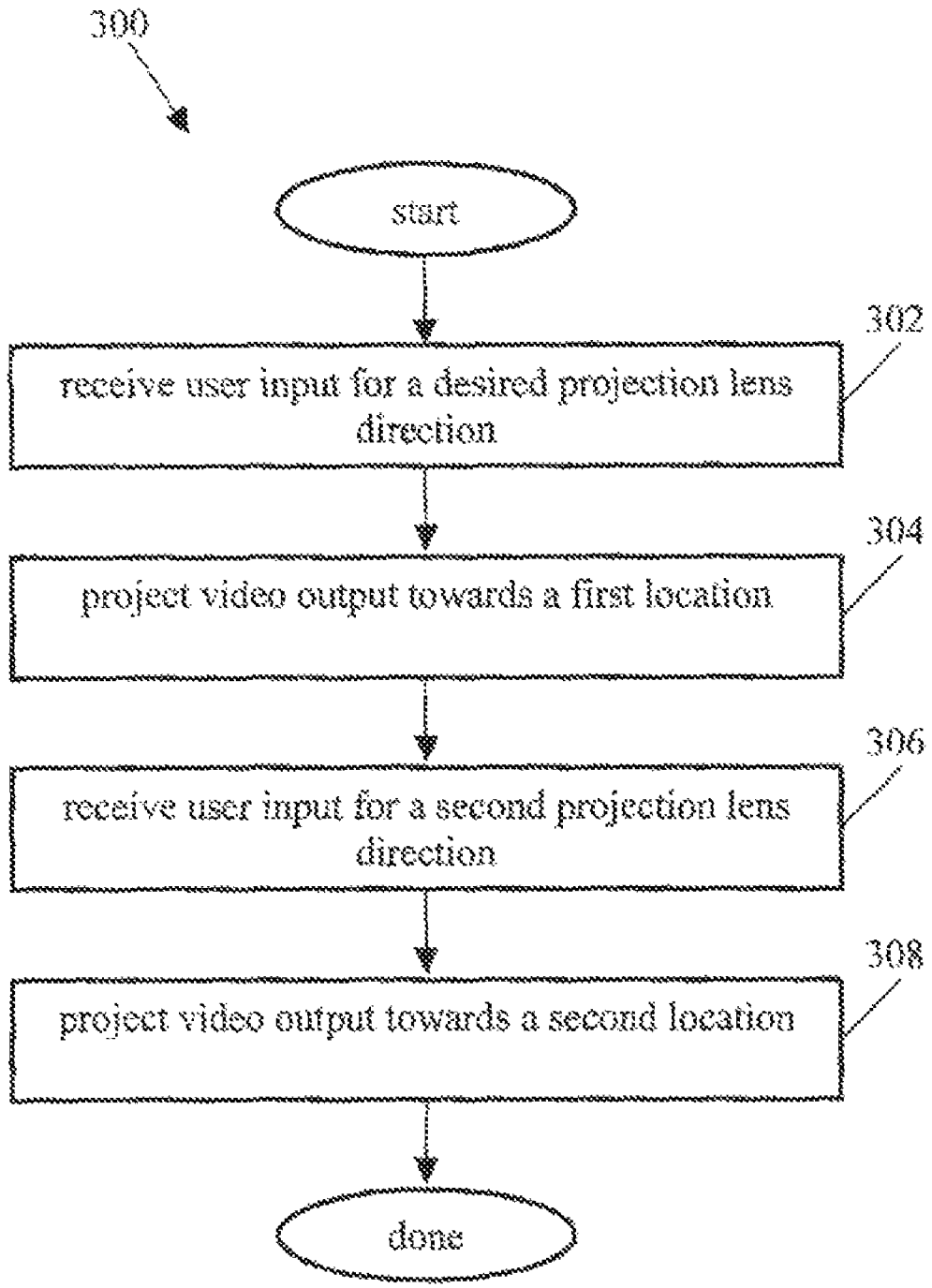
FIG. 5A illustrates a process flow for projecting video output from a display device in accordance with one embodiment of the invention.

FIG. 5A illustrates a process flow 300 for projecting video output from a display device in accordance with one embodiment of the invention. Video output from a display device described herein comprises light modulated according to video data included in a video signal. For example, the video output may include a single image repeatedly displayed at the projector refresh rate over time, or for motion picture video output, a continuous sequence of images individually modulated by the optical modulation device.

Process flow 300 begins by projecting video output towards a first location (304). Typically, this occurs in response to receiving user input for a desired projection lens direction (302), e.g., the user manipulates the display device and points a projection lens included in the display device in a first direction directed at the first location. One option for pointing a projection lens according to projector designs provided above includes positioning projection chamber 14 while the user holds base 12. Alternately, a user may position the projection chamber 14 and point projection lens 37 without holding base 12 if there is sufficient resistance between base 12 and an object that supports base 12.

Referring back to FIGS. 1, 2A, and 2B for a brief description of projection according to display device 10, light generated by light source 64 is collected by fiber-optic interface 70 for transmission along fiber-optic cables 72 from base 12 to projection chamber 14. In one embodiment, light generation may include light produced by a lamp 91 that is reflected by a reflecting mirror 93 into an incident surface of a rod shaped optical integrator 95 (FIG. 2B). The incident light is then reflected a plurality of times in the rod shape optical integrator 95 such that light is about uniform across the flux area before output from the optical integrator 95 to one or more condensing lenses and subsequent transmission into fiber-optic interface 70. In another embodiment, light generation includes light produced by one or more diode lasers whose output is fed into fiber-optic interface 70. An output fiber-optic interface 104 and lenses 106 and 108 convert light transmitted by fiber-optic cable 72 to a size suitable for transmission onto optical modulation device 102 via reflection within prism 110.

Light propagating through prism component 110a reflects off a surface 110d at interface 110c by total internal reflection and forms a reflected pre-modulated beam directed towards optical modulation device 102. The reflected pre-modulated beam travels through prism component 110a to reach optical modulation device 102. Each mirror in optical modulation device 102 reflects light in its 'on' state back into prism component 110a and through interface 110c without internal reflection such that the light propagates into prism component 110b and out an exit face 110e of prism 110. Light output through exit face 110e is characterized by output optical path 31, which propagates through one or more projection lenses 112 that manipulate image light for enlarged display onto a screen or suitable receiving surface.

An optical path output from the projection lens, such as path 31 described above for display device 10, relates the location of a projected video output to the current projection lens direction and projection chamber position. Although typically not visible to a user, the optical path characterizes a principal direction of light output from the projection lens. The present invention allows a user to change the location of light output on a receiving surface, such as a wall, for a projector by pointing the projection lens in one or more desired directions. For example, a user may point a projection lens and locate a projected image onto a wall between various obstacles on the wall by manipulating the position of the projection chamber.

At some subsequent time, process flow 300 continues by receiving user input for a second projection lens direction (306) and projecting the video output towards a second receiving surface location (308). Typically, this occurs in response to a user manually pointing a projection lens included in the display device in a second direction directed at the second location, e.g., to avoid a new obstacle in the projection path, or to use a new receiving surface to facilitate viewing by new people. In one embodiment, re-pointing of a projection lens and location of projected video output occurs without a user changing positioning between an object that supports the display device and a portion of the display device that includes the light source that generates light. For display device 10, base 12 includes the light source and is not moved between re-positioning of the projected video output. A spring-based clip attachment may be secured to base 12 (as described above with respect to FIG. 1) and clipped to a vertical wall such as that associated with a cubicle or bookshelf. In this case, the projection lens may be pointed and re-pointed without changing positioning between the base and the object that supports the base, namely, the vertical wall. In another embodiment, a base including the light source rests on a table surface, shelf, one or more books, or another flat surface or object. Again, the projection lens may be pointed and re-pointed without changing positioning between the base relative to the surface that the base rests upon.

Cumulatively, the ability to rest base 12 on a flat surface and/or clip base 12 onto non-horizontal objects allows display device 10 to be used in a variety of positions and angles not traditionally associated with projector usage. In environments where no flat surfaces are available, positional interface 200 of FIG. 4A allows a user to bend tubing 202 and orient projection chamber 14 and projection lens 37 to provide a horizontal image—regardless of the geometry between the object that supports base 12 and a horizontal image. For example, when base 12 is clipped sideways onto a vertical wall, tubing 202 may be bent 90 degrees to re-orient projection chamber 14 vertically and allow its projected video output for regular horizontal viewing.

In one embodiment, the first direction and the second direction differ by an angle of at least 30 degrees, such as that allowed by any the device designs described above. The angular difference may be in a lateral direction, a vertical direction, or some combination thereof. For user changes in projection lens direction that alter the lateral location of the projected image, process flow 300 may also comprise horizontal keystone correcting the projected image. This typically occurs in response to user input via a keystone correction tool included with the projector, or implemented in software on a computer system that outputs video data to the projector. Similarly, process flow 300 may also comprise vertical keystone correcting the projected image after vertical image location and direction changes of the projection lens relative to the base. In another embodiment, the first direction and the second direction differ by an angle of at least 60 degrees, as potentially allowed by one of the positional interfaces described above. Positional interface 200 of FIG. 4A may also permit the first direction and the second direction to differ by at least 90 degrees—vertically and/or laterally. Positional interface 270 is shown with a 180 degree change orientation between FIG. 4C and FIG. 4F, for example.

Directional changes such as this are particularly useful to allow image locations on different receiving surfaces for the same position of the portion of the display device that includes the light source. Display device 10, for example, permits projection of video output on orthogonal walls without moving base 12.

Figure 5B:
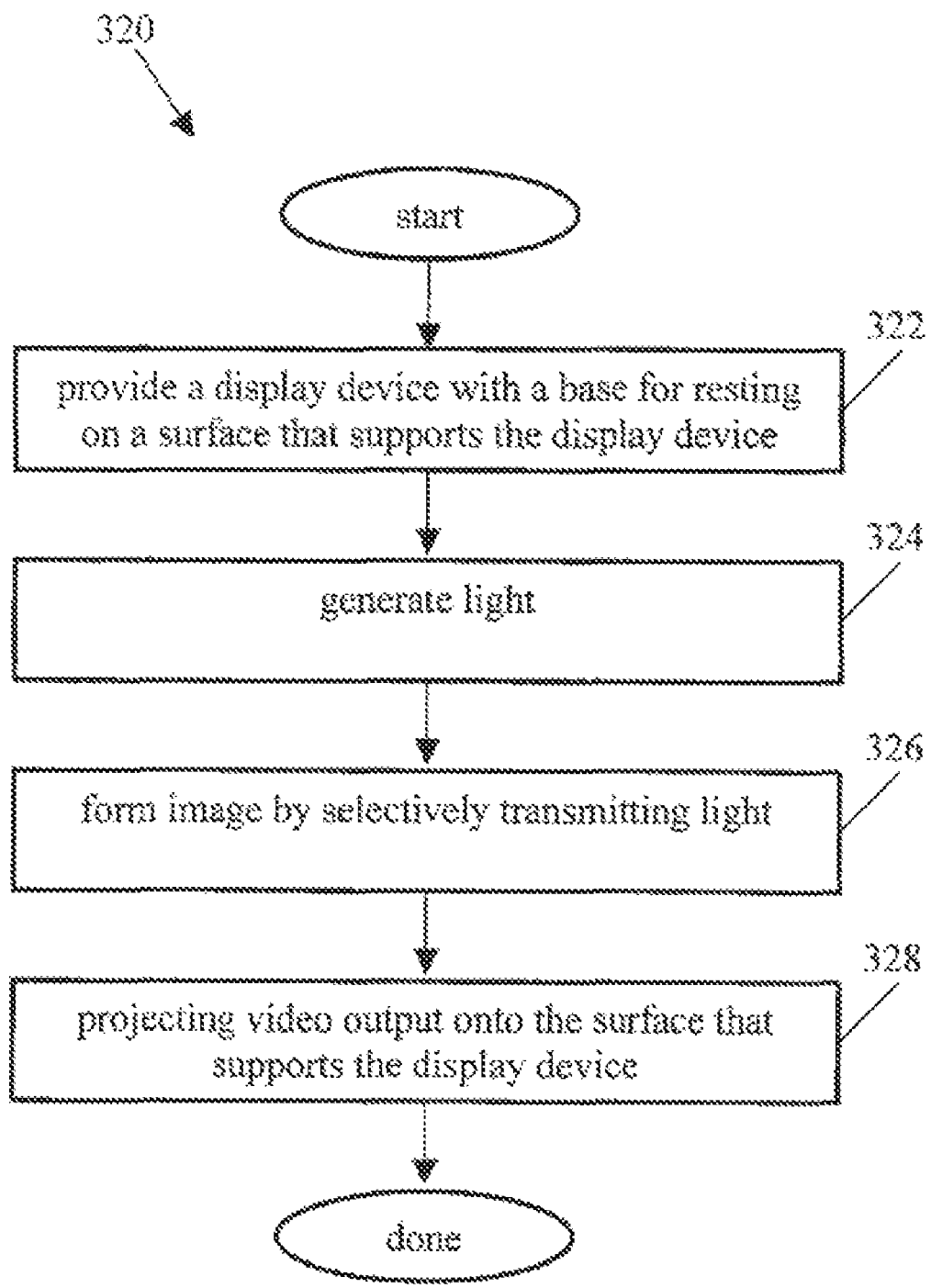
FIG. 5B illustrates a process flow for projecting video output from a display device in accordance with another embodiment of the invention.

FIG. 5B illustrates a process flow 320 for projecting video output from a display device in accordance with another embodiment of the invention. The display device used in process flow 320 permits pointing of a projection lens onto a surface that the display device rests upon. For the display device of FIG. 4A for example, positional interface 200 that is long enough relative to a minimum throw distance for the projection lens system such that a user may point the projection lens towards a surface that the display device rests upon, thereby casting an image on the surface. In one embodiment, the positional interface 200 is longer than the minimum throw distance. As described above, the corrugated tubing 202 may have a length between about 12 inches and about 24 inches. In this case, the projection lenses in display device 10 are designed to have a minimum throw distance from about 12 inches to about 18 inches, or less, for example.

Process flow 320 begins by providing a display device, such as one of those described above, and base included with the display device for resting on a surface that supports the display device (322). The surface may be that included on a table, counter, floor, etc. This allows process flow 320 to occur in environments where wall space is not readily available. In addition, the surface need not be horizontal. For example, the display device may be clipped onto a wall and project an image onto the same wall that supports the device.

Light is then generated within the display device using a light source (324). One or more images are then formed by selectively transmitting light generated by the light source according to video data included in a video signal provided to an optical modulation device included in the display device. Light generation (324) and image formation (326) suitable for process flow 320 is described above in process flow 300.

In response to a user pointing a projection lens included with the display device towards the surface that supports the display device, the video output is projected onto the surface (328). Typically, the image is projected onto a different portion of the same surface that the projector rests upon, such as a portion forward from the display device when it rests on a table surface. In one embodiment, the display device is designed for short range use and includes a projection lens system that aggressively enlarges the image as distance from the projection lens increases and as the image is projects from the display device. Process flow 320 may also comprise vertical keystone correcting the projected image in response to user input via a keystone correction tool included with the projector.

In one aspect, the present invention divides projection display devices into multiple chambers. As described herein, a chamber refers to a compartmented space dedicated to one or more functions of display device design. Display device 10 of FIG. 1 includes two main chambers: a light source chamber 65 within base 12 for generating and manipulating light for transmission to an optical modulation device; and projection chamber 14 for a) housing and servicing an optical modulation device that selectively transmits light according to image data and b) housing a projection lens system that outputs a projected image. Display device 10 also separates the two chambers with a degree of freedom provided by positional interface 16.

Multiple chamber configurations of the present invention separate a projector into multiple compartments and may improve projector design and performance. For example, the multiple chamber design of display device 10 facilitates heat control. Typically, a light source and power supply contribute the largest share of heat production for a projector. Meanwhile, the optical modulation device requires the strictest heat regulation requirements. The present invention places a light source and power supply into a chamber separate from a chamber that contains a heat sensitive optical modulation device. In other words, the multiple chamber design advantageously keeps heat sensitive components away from the heat generating components, thereby easing temperature control of the heat sensitive components. The multiple compartment design also facilitates control of heat conduction through a projector. More specifically, heat conduction may be limited and channeled by design between multiple compartments to specific paths, e.g., through positional interface 16 for heat generated in housing 20 of base 12 that travels by conduction to housing 32 (and components therein) of projection chamber 14. Heat conduction is then more readily controlled due to the limited and known paths of heat conduction. For example, one or more rubber seals that reduce heat conduction may be placed at the coupling between positional interface 16 and housing 20 of base 12 or between positional interface 16 and housing 29 of projection chamber 20.

In addition, conventional rectangular static housing projector designs often conform in size to maximum dimensions of large hardware used to create and manage the light. For example, cinder block projector designs are often regulated in a length or width by dimensions of the projection lens system and regulated in height by a lamp. This often creates considerable unused space within the rectangular projector, which increases size and encumbrance—and decreases portability—of the projector. The present invention however enables designers to customize chamber packaging according to component dimensions in each chamber, thereby conforming packaging to components within a chamber and minimizing unused space. This, for example, may allow projection chamber 14 to maintain a substantially cylindrical profile that matches the projection lens system; and may allow base 12 to occupy a smaller footprint than traditionally allowed by the output projection lens system.

Display device 10 may employ design alternatives that reduce device weight. In one embodiment, display device 10 is less than five pounds. As mentioned above, walls of housing 32 and housing 20 may comprise a lightweight and stiff molded plastic or aluminum that reduces overall weight of display device 10. In addition, embodiments including diode lasers for generating light reduce the weight of display device 10 relative to designs that employ a white light lamp and their associated light manipulation components, such as a color wheel, relay optics, color wheel motor, etc. In another embodiment, display device 10 is less than 2.5 pounds.

With respect to usage, the present invention may receive video data from a range of systems and devices. In addition to personal computers such as desktop computers and laptop computers, a variety of other computer systems and digital devices may output video data to a display device of the present invention. Handheld computers, portable digital assistants and portable digital devices such as cellular telephones are increasingly integrating computer-related and video functionality, including the ability to access the resources of an external network such as the Internet and the ability to output video data to an external display device. Other portable digital devices such as portable video games, portable digital video recorders and digital cameras may also provide video output to display device described herein. One current trend is hybrid entertainment devices that integrate the functionality of computer systems, stereos, and televisions. In addition, set-top boxes associated with cable television services are becoming much more sophisticated user interfaces as interactive services become available to cable customers. Any of these devices may employ and benefit from video output using a display device as claimed herein. The scope of digital computer systems is expanding hurriedly and creating many systems and devices that may employ the present invention. A merging of television, video, and computer functions into a single device also adds value to the present invention since the sensitivity to image quality and size is high in applications such as motion picture viewing. Video game consoles that use large display devices may also benefit from the present invention. Moreover, those skilled in the art will appreciate that the invention may be practiced with other computer system configurations, multiprocessor systems, microprocessor-based or programmable consumer electronics, minicomputers, mainframe computers, and the like.

Display device 10 is well-suited for display of motion pictures and still photographs onto screens. In addition, display device 10 is also useful for conducting sales demonstrations, playing video games, general computer usage, business meetings, and classroom instruction, for example.

Portable display devices of the present invention may provide projected images having an image size ranging from inches to many feet, as determined by a user and environment. Image size for a projector typically depends on mechanical factors such as the distance from the projector to the receiving surface and a splay angle for the projection lens. Since many conventional projectors and projectors of the present invention may offer image sizes with diagonal spans up to thirty feet, it is common for light output by a projector to encounter physical obstacles—either along a projection path between the projection lens and receiving surface, at the receiving surface, or both. Obstacles at the receiving surface often force a user to move a conventional cinder block projector closer to the wall to reduce image size. Any obstacles along the one-dimensional light path between the projector and receiving surface also conventionally forced a user to move the cinder block projector. In general, cinder block designs only offer one-dimensional output for a video image along an optical output path, which is fixed relative to the projector's base. When the projector is large and bulky, or needs to rest on a large flat surface such as a table, moving the projector may not always be simple or feasible. In a room or application where numerous receiving surfaces are present, but locations to rest a projector are limited, the one-dimensional link often limits image placement and compromises usage.

The present invention, however, enables a user to flexibly locate a projected image in many positions relative to a single position of the display device. Thus, positioning between a projected image and a projector may vary three-dimensionally according to two dimensions of image placement offered by display devices described above, and a third dimension based on distance between the projector and receiving surface. This enables a user to avoid obstacles between a projector and a receiving surface, and to maximize image size based on specific conditions. For example, a user may tailor projector output used in a living room or office to navigate projection path obstacles such as plants, bookshelves, etc., that normally would obstruct the projection path and limit where the projector is placed, where the receiving image is cast, and limit image size.

The present invention also enables new uses for projectors. Cubicles and other portable office environments offer limited space, and often only a single suitable receiving surface. These confined environments also offer limited landing locations to rest a large footprint cinder block projector. Conventional cinder block projectors are currently not used in these environments due to the limited receiving surface space and the large number of obstacles that would be encountered between the receiving surface and the cinder block projector in its select few permissible landing locations. The present invention however enables a worker within confined spaces to a) locate the display device in many more locations due to its smaller footprint, b) readily clip the display device onto vertical walls with a clip attachment as described above with respect to FIG. 1, and c) point a projection lens flexibly from almost any angle in the cubicle to a single or desired receiving surface location. Flexibly usage such as this also extends to other environments such as vehicles, small offices, and any other confined spaces that offer limited receiving surfaces and difficult sites to locate a projector.

In one embodiment, positional interface 16 is relatively long and allows projection chamber 14 to be pointed down onto a surface that base 12 rests upon, such as a table. This allows display device 10 to be used in environments such as libraries, office desks and coffee shops where a user has table space but not wall space.

In another embodiment, display device is configured to increase display device endurance when relying on limited battery power reserves. The device may then be configured to reduce power consumption within a projection type display device using one or more hardware or software options. In one embodiment, an array of diode lasers or non-lasing diodes generates light for subsequent optical modulation according to image data. Compared to conventional halogen and other white light generating lamps, diode lasers offer a light generation option that consumes significantly less power for a given image luminance. Secondly, power consumption by fans employed for heat management within the display device is decreased since the diode array generates significantly less heat than a lamp. The diode array also outputs colored light, thereby eliminating the need for a color wheel and a motor that rotates the color wheel. This eliminates the power required for the color wheel motor. In addition, this reduces the power required for managing heat produced by the color wheel motor. In another embodiment, the display device does not include audio output, which decreases size and reduces power consumption for the device.

Although the foregoing invention has been described in some detail for purposes of clarity of understanding, those skilled in the art will recognize that various modifications may be made within the scope of the appended claims. For example, although the positional interfaces described herein have coupled to the projection chamber from the bottom, it is understood that a positional interface may couple to the projection chamber from the rear. In this case, an air duct, electrical connection and optical cabling may extend through the projection chamber to its respective functional location. The invention is, therefore, not limited to the specific features and embodiments described herein and claimed in any of its forms or modifications within the scope of the appended claims.

What is claimed is:

1. A device, comprising:
a base;
a projection chamber configured to transmit light provided by a light source according to data included in a signal; and
a positional interface coupled to the base and the projection chamber, wherein the positional interface is configured to stabilize the projection chamber in one or more positions relative to the base, and the positional interface comprises a component for dissipating heat.

2. The device of claim 1, wherein the component for dissipating heat comprises a valve configured to regulate air flow between the base and the projection chamber.

3. The device of claim 2, wherein the valve is coupled to fan circuitry, and the valve is further configured to regulate the air flow according to a usage of at least one fan controlled by the fan circuitry.

4. The device of claim 2, wherein the valve is further configured to control an opening of an air duct between the base and the projection chamber, and the opening depends on the usage of the at least one fan.

5. The device of claim 1, wherein the component for dissipating heat comprises at least one heat sink configured to dissipate absorbed heat.

6. A method, comprising:
transmitting light corresponding to an image from a base to a projection chamber via a positional interface that mechanically stabilizes the projection chamber in a position relative to the base; and
dissipating heat through the positional interface.

7. The method of claim 6, wherein the dissipating the heat through the positional interface comprises regulating air flow between the base and the projection chamber via a valve in the positional interface.

8. The method of claim 7, wherein the regulating includes regulating via the valve coupled to fan circuitry, and regulating the air flow according to a usage of at least one fan controlled by the fan circuitry.

9. The method of claim 8, wherein the regulating the air flow comprises controlling an opening of an air duct between the base and the projection chamber, and determining a size of the opening as a function of usage of the at least one fan.

10. The method of claim 6, wherein the dissipating the heat through the positional interface comprises dissipating absorbed heat via at least one heat sink in the positional interface.

11. A non-transitory computer-readable storage medium having instructions stored thereon that, in response to execution, cause at least one device to perform operations comprising:
transmitting light corresponding to an image from a base to a projection chamber via a positional interface that mechanically stabilizes the projection chamber in a position relative to the base; and
dissipating heat through the positional interface.

12. The non-transitory computer-readable medium of claim 11, wherein the dissipating the heat through the positional interface comprises regulating air flow between the base and the projection chamber via a valve in the positional interface.

13. The non-transitory computer-readable medium of claim 12, wherein the regulating includes regulating via the valve coupled to fan circuitry, and regulating the air flow according to a usage of at least one fan controlled by the fan circuitry.

14. The non-transitory computer-readable medium of claim 13, wherein the regulating the air flow comprises controlling an opening of an air duct between the base and the projection chamber, and determining a size of the opening as a function of usage of the at least one fan.

15. The non-transitory computer-readable medium of claim 11, wherein the dissipating the heat through the positional interface comprises dissipating absorbed heat via at least one heat sink in the positional interface.

16. A system comprising:
means for transmitting light corresponding to an image from a base to a projection chamber via a positional interface that mechanically stabilizes the projection chamber in a position relative to the base; and
means for dissipating heat through the positional interface.

17. The system of claim 16, wherein the means for dissipating heat comprises means for regulating air flow between the base and the projection chamber via a valve in the positional interface.

18. The system of claim 17, wherein the valve is coupled to fan circuitry, and the means for regulating the air flow regulates the air flow according to a usage of at least one fan controlled by the fan circuitry.

19. The system of claim 18, wherein the means for regulating the air flow includes means for controlling an opening of an air duct between the base and the projection chamber, and a size of the opening is a function of usage of the at least one fan.

20. The system of claim 16, wherein the means for dissipating heat comprises means for dissipating absorbed heat via at least one heat sink in the positional interface.

* * * * *

UNITED STATES PATENT AND TRADEMARK OFFICE
CERTIFICATE OF CORRECTION

| | |
|---|---|
| PATENT NO. | : 8,366,282 B2 |
| APPLICATION NO. | : 13/405834 |
| DATED | : February 5, 2013 |
| INVENTOR(S) | : Plut |

Page 1 of 1

It is certified that error appears in the above-identified patent and that said Letters Patent is hereby corrected as shown below:

In the Specification

In Column 6, Line 49, delete "upper end 16b" and insert -- upper end 16a --, therefor.

In Column 7, Line 35, delete "positional 16 interface" and insert -- positional interface 16 --, therefor.

In Column 13, Line 2, delete "chamber 29" and insert -- chamber 14 --, therefor.

In Column 13, Line 34, delete "housing 29" and insert -- housing 20 --, therefor.

In Column 15, Line 4, delete "interface 102," and insert -- interface 104, --, therefor.

In Column 27, Line 10, delete "housing 29" and insert -- housing 20 --, therefor.

In Column 27, Lines 10-11, delete "chamber 20." and insert -- chamber 14. --, therefor.

Signed and Sealed this
Sixth Day of May, 2014

Michelle K. Lee
*Deputy Director of the United States Patent and Trademark Office*